United States Patent [19]

Nally et al.

[11] 4,277,776
[45] Jul. 7, 1981

[54] MAGNETIC INK CHARACTER RECOGNITION APPARATUS

[75] Inventors: Robert B. Nally; James F. Akister; David Hulford, all of Waterloo, Canada

[73] Assignee: NCR Canada Ltd - NCR Canada Ltee, Mississauga, Canada

[21] Appl. No.: 81,491

[22] Filed: Oct. 1, 1979

[51] Int. Cl.[3] .................. G06K 9/20; H03K 5/153
[52] U.S. Cl. .................. 340/146.3 AG; 307/351; 328/117; 328/151; 340/146.3 C
[58] Field of Search .......... 340/146.3 C, 146.3 AG; 235/449, 450, 454, 466, 474; 307/350, 351, 357, 358, 359; 328/115, 116, 117, 147, 151

[56] References Cited

U.S. PATENT DOCUMENTS

| | | | |
|---|---|---|---|
| 3,302,174 | 1/1967 | Djinis et al. | 340/146.3 C |
| 3,535,682 | 10/1970 | Dykaar et al. | 340/146.3 C |
| 3,634,770 | 1/1972 | Spreitzhofer | 307/351 |
| 3,761,876 | 9/1973 | Flaherty et al. | 340/146.3 AG |
| 3,891,930 | 6/1975 | Petrusson | 307/351 |
| 4,143,356 | 3/1979 | Nally | 340/146.3 C |
| 4,148,010 | 4/1979 | Shiau | 340/146.3 C |
| 4,153,895 | 5/1979 | Weisbrod et al. | 340/146.3 AG |

*Primary Examiner*—Leo H. Boudreau
*Attorney, Agent, or Firm*—J. T. Cavender; Wilbert Hawk, Jr.; Richard W. Lavin

[57] ABSTRACT

A method and apparatus for processing data used in a character recognition system in which a threshold voltage value is developed to be applied to an analog waveform representing an unknown character to determine the start of the character waveform. Samples of the first peak of the waveform are generated and a value representing the area under the first peak is developed. Data processing means divides the area by the number of samples taken to arrive at a threshold voltage value which, when applied to the samples taken, determines the start of the character waveform. The voltage amplitudes of adjacent samples of the character waveform are then averaged and the number of samples reduced by one half. A predetermined number of samples having the maximum voltage amplitudes located within peak areas of the waveform are normalized for use by a utilization device in recognizing the unknown character.

18 Claims, 23 Drawing Figures

| FIG. 3A | FIG. 3B | FIG. 3C |
| --- | --- | --- |
| FIG. 3D | FIG. 3E | FIG. 3F |
| FIG. 3G | FIG. 3H | FIG. 3I |

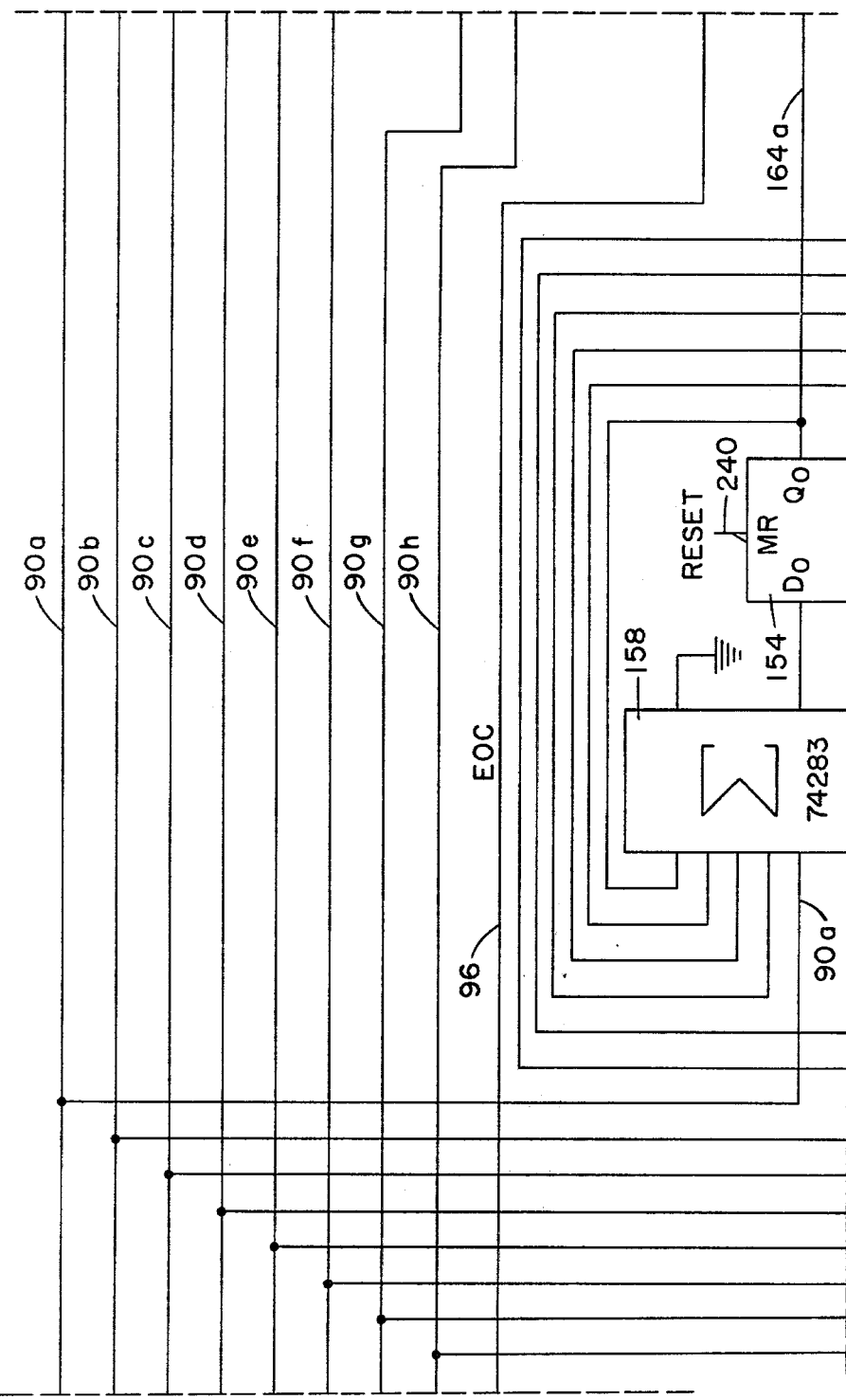

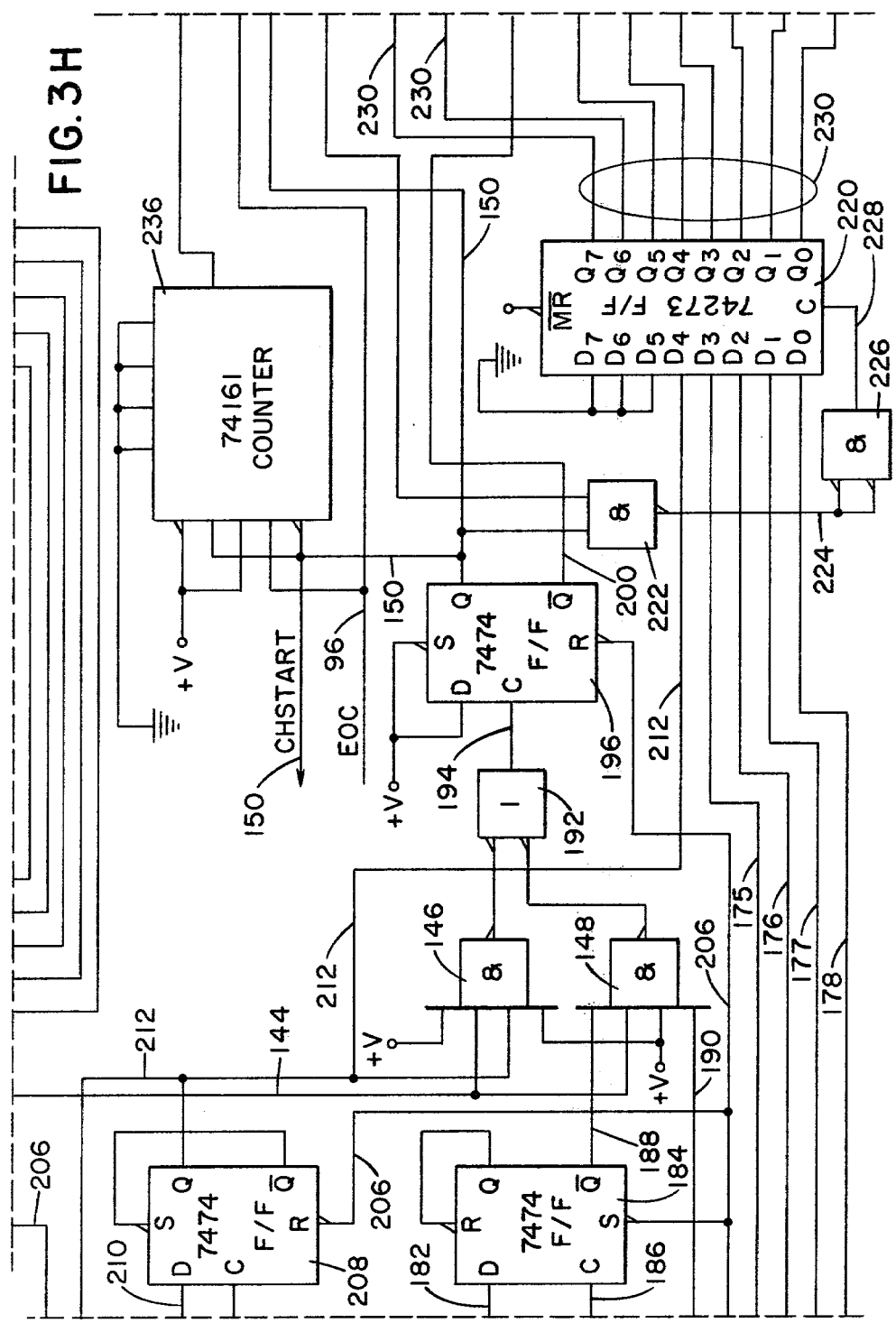

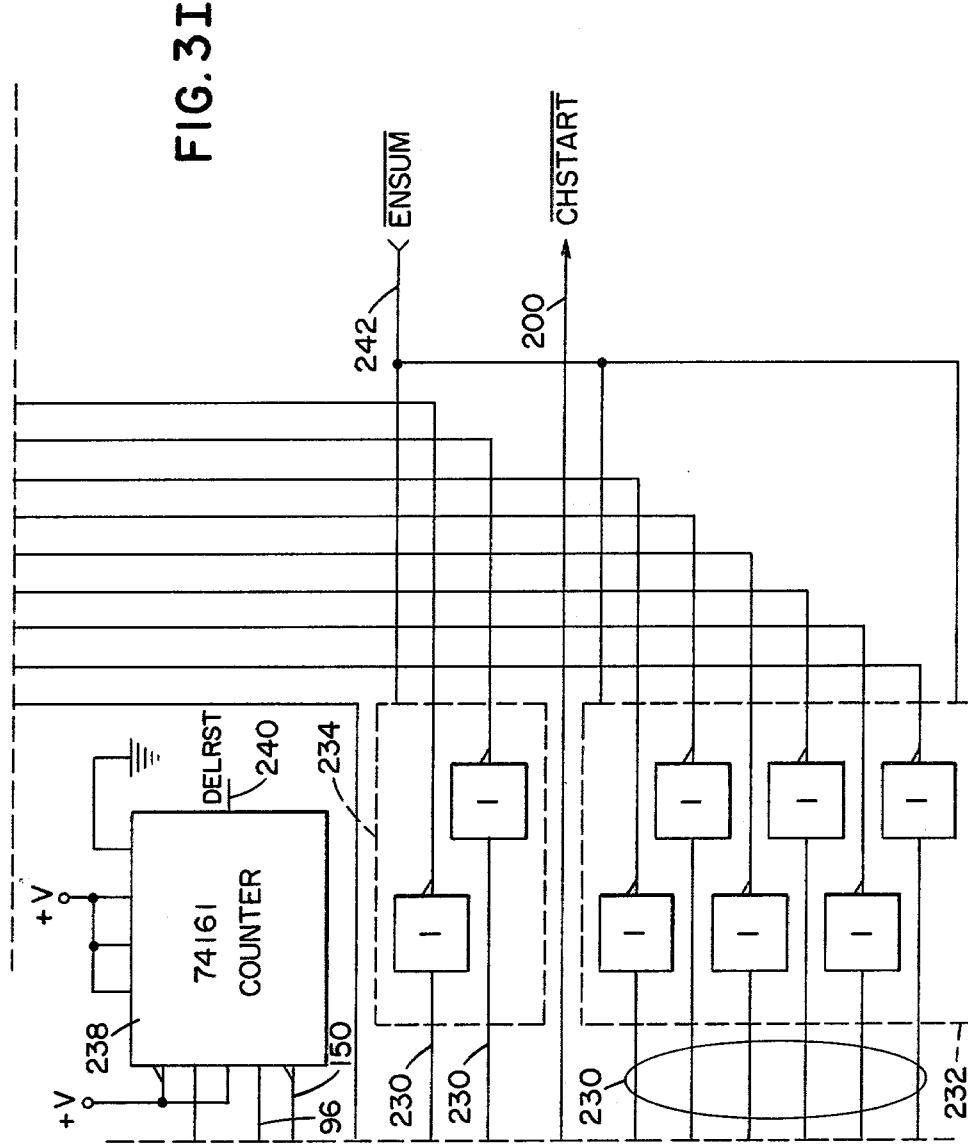

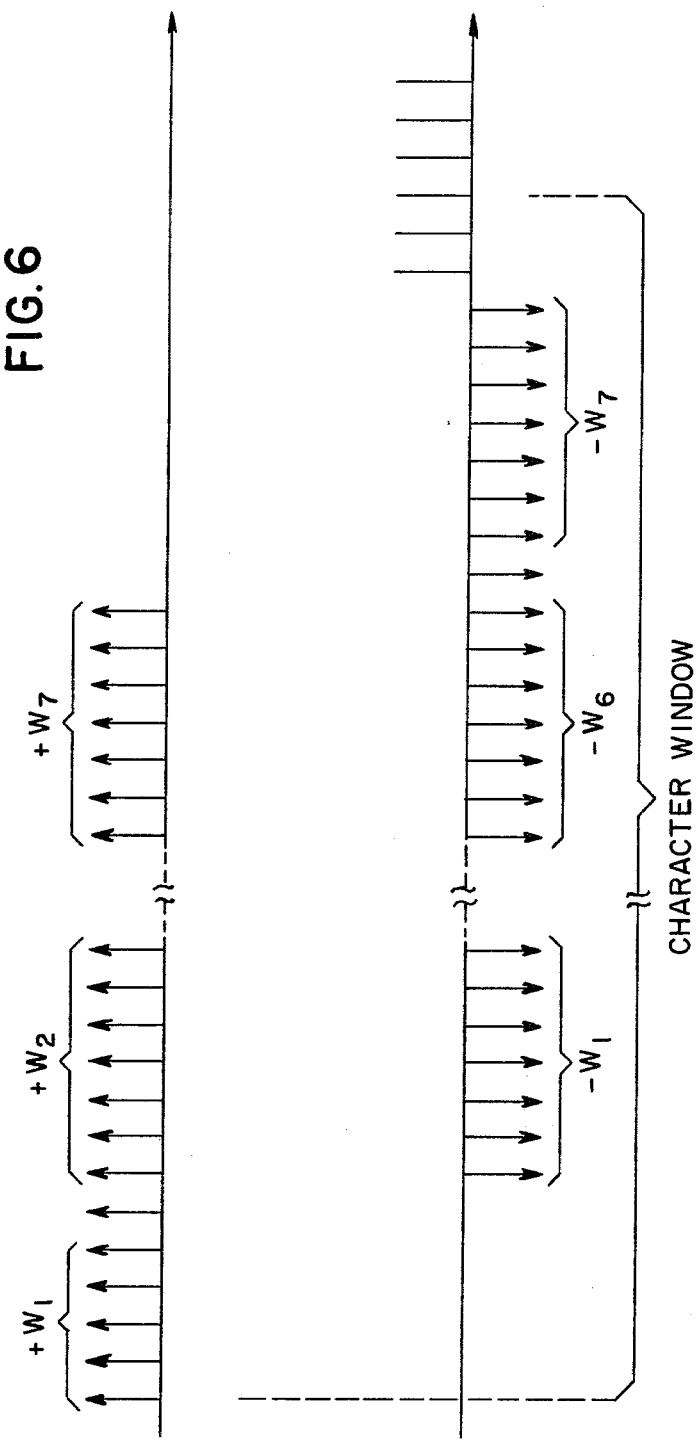

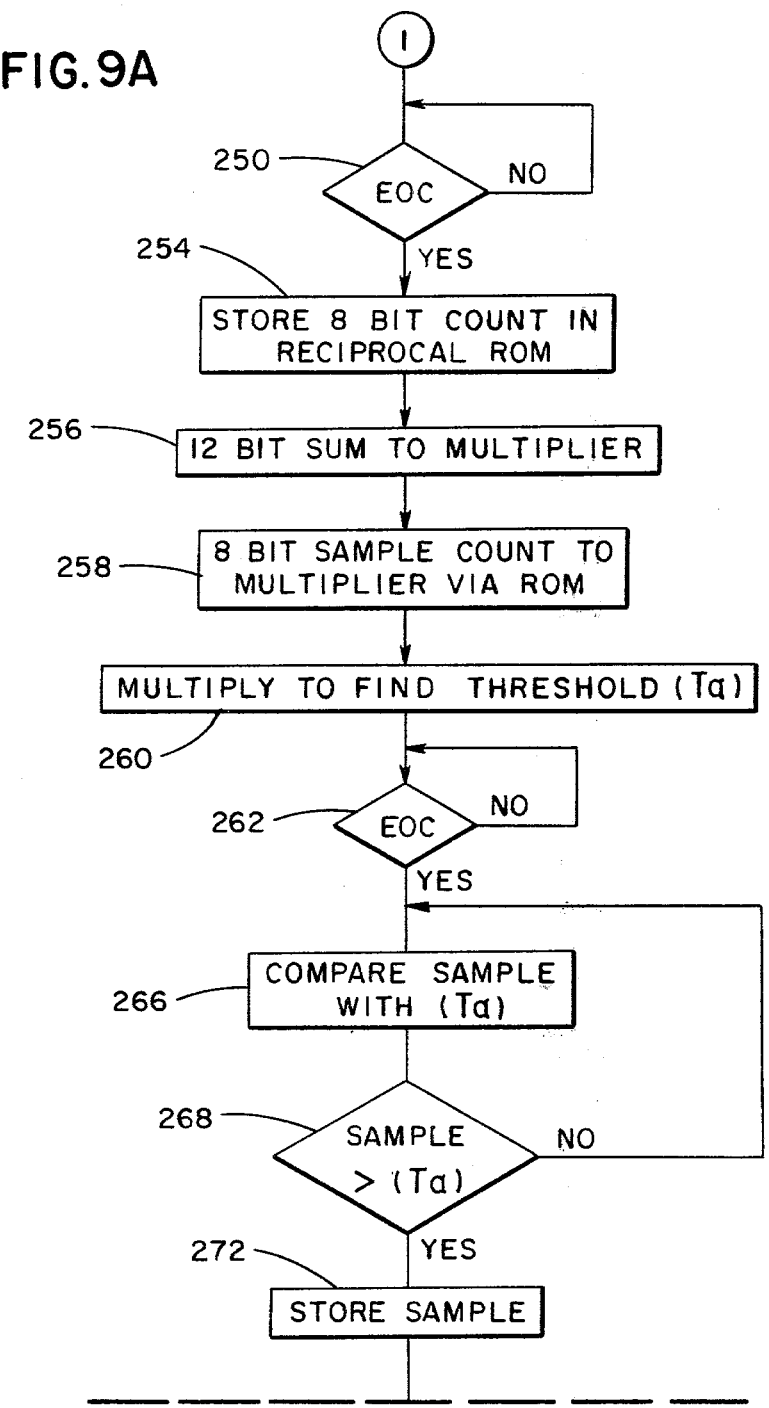

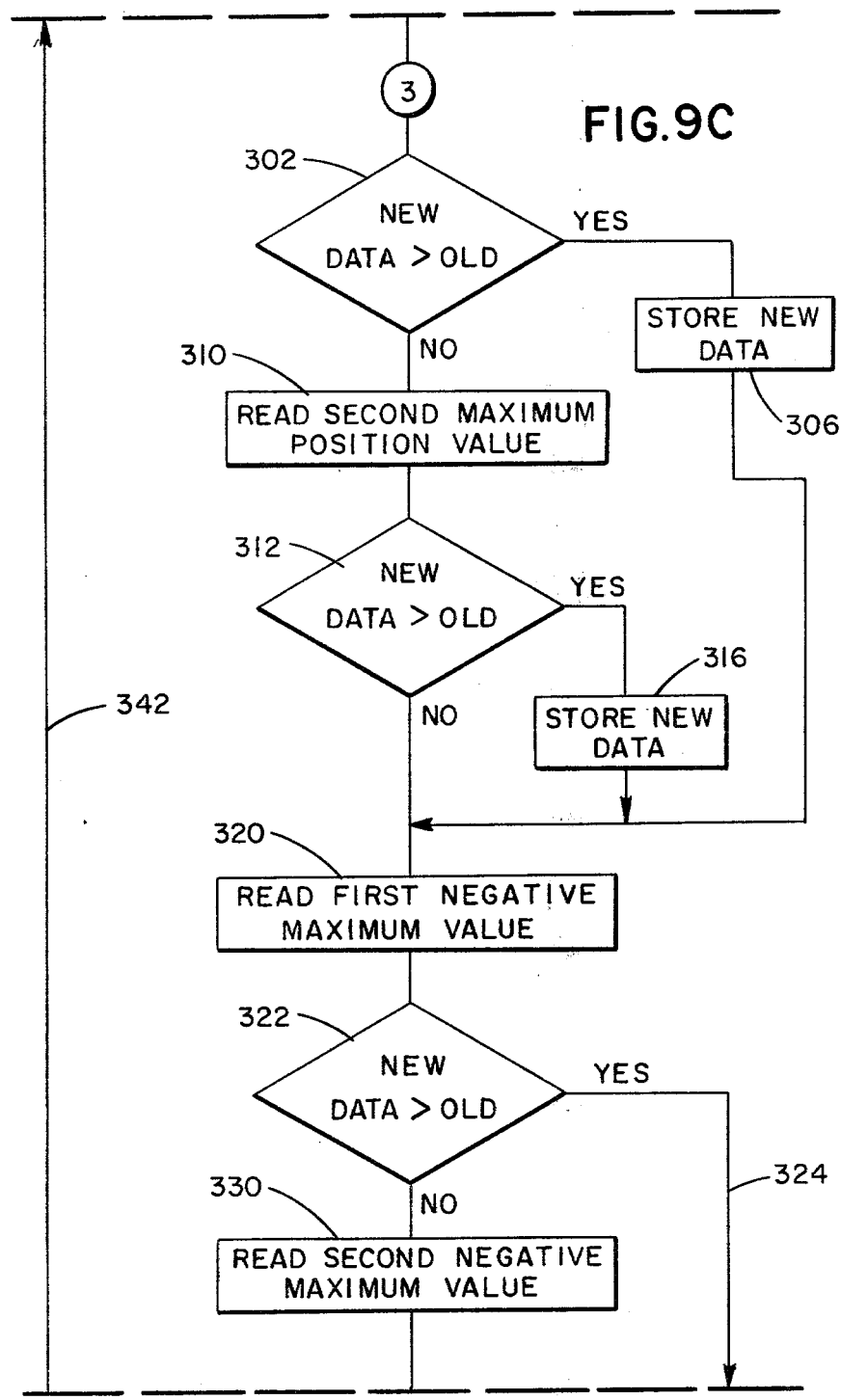

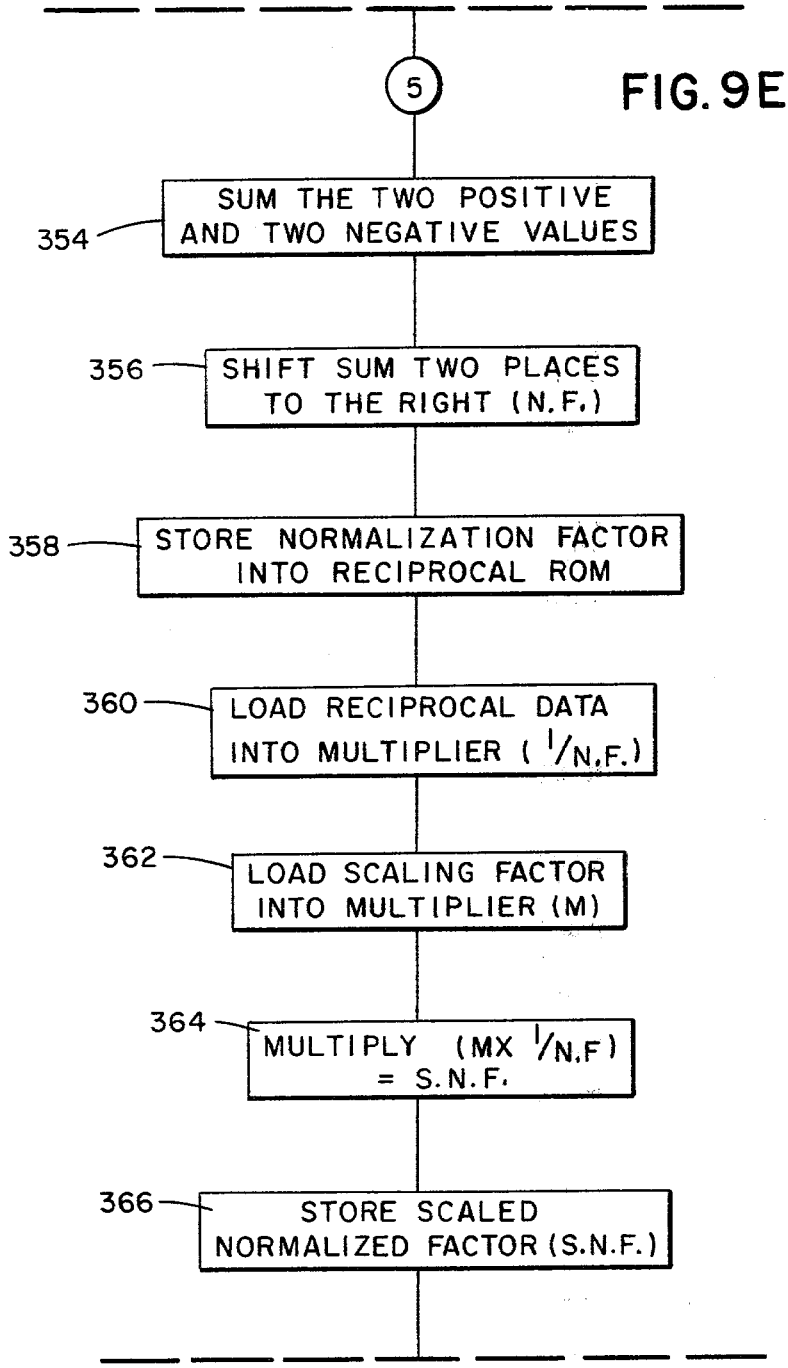

MAGNETIC INK CHARACTER RECOGNITION APPARATUS

CROSS-REFERENCE TO RELATED APPLICATIONS

Character Recognition System, co-pending application Ser. No. 80,952, filed on even data herewith, invented by Robert B. Nally, James F. Akister and David Hulford, assigned to the NCR Canada, Ltd.

BACKGROUND OF THE INVENTION

The present invention relates to the field of machine recognition of magnetically imprinted characters on a document and more particularly to a method and apparatus for generating a variable threshold which is applied to a digitized waveform representing an unknown character for deriving peak values which are processed for use in identifying the unknown characters.

In single-gap magnetic character reading systems, a single analog input waveform is obtained by passing the characters to be sensed, normally printed on a document, beneath a magnetic read head at least as wide as the height of the characters and having a single flux gap. The signal generated by the read head is a derivative waveform representing the rate of change of magnetic flux transversing the head as the characters are scanned. Since the distribution of ink, and thus flux, associated with each different character is unique, the waveform derived for each different character uniquely identifies that character.

To simplify the timing of the waveform analysis process, the characters are provided with stylized geometric features which impart anticipatable timing characteristics to the derived waveforms. Thus, in accordance with this means for reader identification, each character of the E-13B font is divided into a predetermined number of vertical segments corresponding to a location of bar portions of the character. The characters are designed such that the distribution of ink undergoes significant change only at the boundaries between each segment. Hence, peak fluctuations in the derived waveform caused by these variations in ink distribution can occur at only predetermined times during the character scan.

Prior character readers have utilized single or multiple threshold values to eliminate noise levels due to ink splatter, smudges or smearing of the ink which occur during the printing of the documents, since recognition of the unknown characters is based on utilizing the amplitude of each of the peaks of the generated waveform for correlation with known peak amplitude characteristics of each of the E-13B characters to identify the character read. An example of this type of recognition system may be found in U.S. Pat. No. 3,534,334. Usually this type of threshold level is established on the conservative side to insure that all types of noise peaks will be eliminated. Since the exact location of each peak in the waveform is critical to the recognition of the unknown character, it is imperative that the start of the analog waveform be determined as accurately as possible since any variation in the location of the peaks in the waveform will shift the location of the peaks from their true position, thereby reducing the accuracy of the recognition operation. It is therefore an object of this invention to provide a magnetic character recognition system which provides highly accurate data in response to the generation of an analog signal representing an unknown character. It is a further object of this invention to provide a character recognition system which detects accurately the start of the character waveform. It is another object of this invention to provide a character recognition system which minimizes the effects of variations in ink intensity found in the characters that are to be read. It is still another object of this invention to provide a character start circuit which will detect the actual start of a character at a high relative speed, yet which circuit is low in cost.

SUMMARY OF THE INVENTION

These and other objects of the invention are fulfilled by providing a system for generating data which is used in recognizing an unknown magnetic character and in which system data representing the area under the first peak of the character waveform is generated as a result of sampling the waveform at a number of points along the curve. Briefly, the voltage level of an adaptive threshold is determined by summing the amplitudes of each of the waveform first peak samples taken and dividing the result by the total number of such samples. The adaptive threshold is then compared with each of the samples taken to locate the start of the waveform. Samples of the full waveform are then taken to determine the maximum amplitudes and their corresponding positions occurring in the waveform to arrive at the peak positions. Further processing of the data includes smoothing the amplitudes of the overall samples taken and reducing their numbers by a factor of two. The resulting samples are then examined to find the maximum amplitude and its corresponding position within each of a number of predetermined located windows, which maximum amplitudes are then normalized for subsequent use in recognizing the unknown character.

BRIEF DESCRIPTION OF THE DRAWINGS

The foregoing and various other objects, advantages, and meritorious features of the present invention will be apparent from the following detailed description and appended claims when read in conjunction with the drawings, wherein like numerals identify corresponding elements and of which:

FIGS. 3A–3I inclusive taken together disclose the logic circuits for generating signals representing the amplitude and position of a number of samples of the first peak and of the overall analog waveform;

FIG. 6 is a schematic representation of the windows generated in accordance with the present invention showing their location along the waveform for extracting the sample with the maximum amplitude together with its location within each window;

FIGS. 9A-9F inclusive are a detailed flowchart showing the operation of said system.

DESCRIPTION OF THE PREFERRED EMBODIMENT

Figure 1:
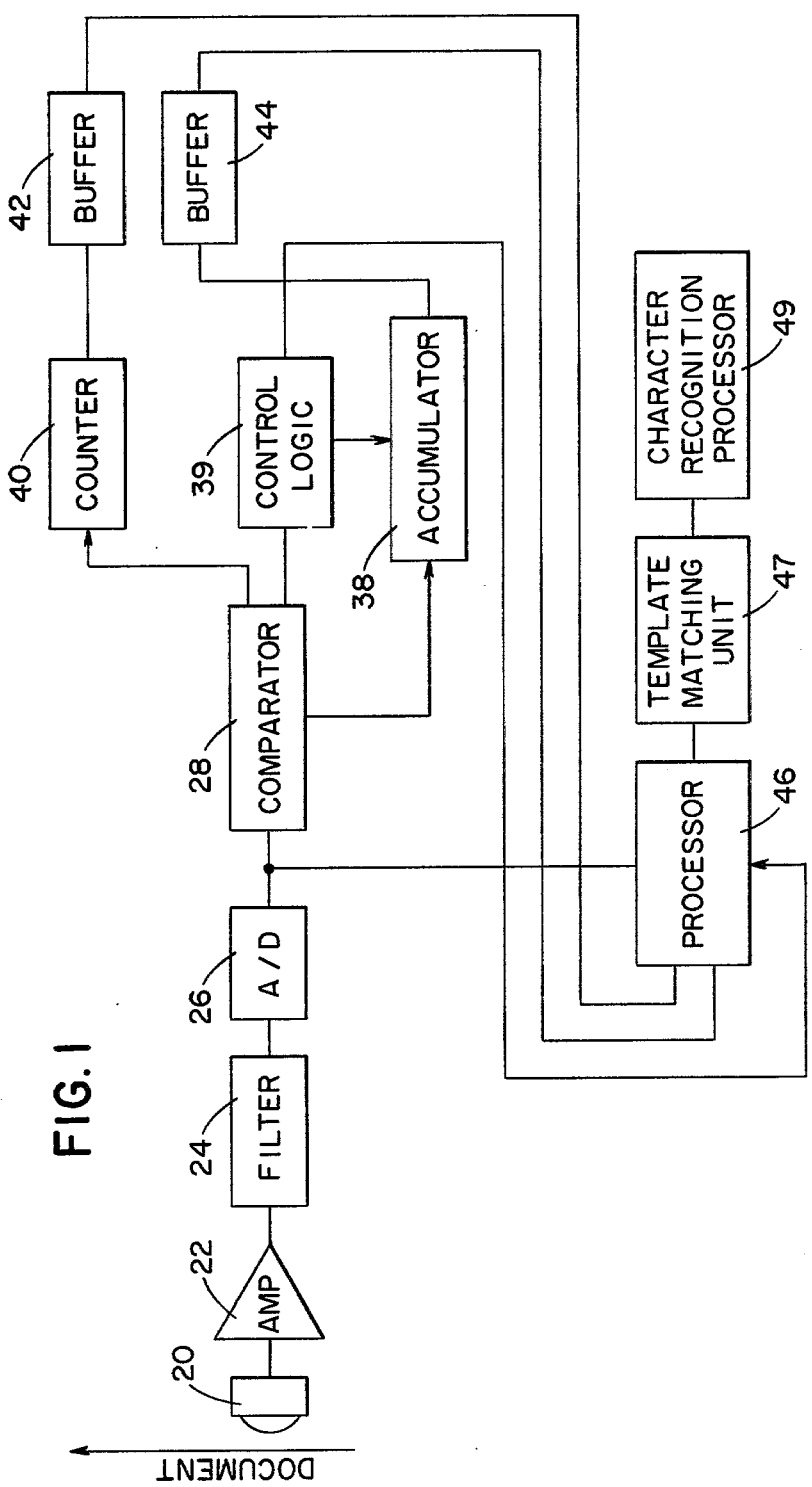
FIG. 1 shows a system block diagram of the invention.
Figures 2, 4:
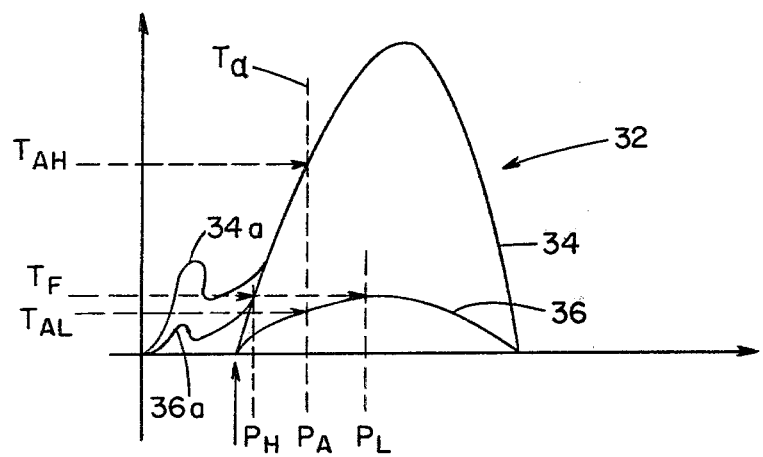
FIG. 2 is a schematic diagram of the first peak in a typical analog waveform generated as a result of scanning a magnetic character showing the location of fixed and adaptive thresholds for high and low intensity peaks.
FIG. 4 is a diagram showing the manner in which FIGS. 3A–3I inclusive are arranged with respect to each other to form said logic circuits.

Referring now to FIG. 1, there is shown a block diagram of the character recognition system which includes the present invention. As illustrated, the system includes a single gap magnetic read head 20 which is positioned adjacent the path of movement of a document having characters printed thereon in magnetic ink. While the characters of the present embodiment are printed in the form of the E-13B character font which has been adopted by the American Bankers Association for use with handling of checks in this country which characters are well known in the art and illustrated in numerous prior references, it is obvious that the recognition system of the present invention can be used with any character font which results in a unique analog waveform when scanned by the read head 20. As the document moves past the read head 20 in the direction indicated by the arrow in FIG. 1, the read head 20 will generate an analog electrical signal corresponding to the time derivative of the change in flux of the magnetized ink defining each character, which signal includes a first peak generally indicated by the numeral 32 (FIG. 2). The character waveform is transmitted from an amplifier 22 through an analog filter 24 for filtering out noise to an analog/digital (A/D) converter 26 which digitizes the analog signals and outputs from block 30 (system operation flowchart of FIG. 7) a byte or eight bits of binary data each representing a sample of the character waveform to a comparator circuit 28 (FIG. 1) used in generating a threshold for determining the actual start of the character waveform in a manner that will be described more fully hereinafter with respect to FIGS. 3A-3I inclusive. The sampling rate of the A/D converter 26 used in the present embodiment is 128 KHz. The analog/digital converter 28 is commercially available as Part No. MN5141 from the Micro Network Corporation of Worcester, Mass.

As shown in FIG. 2, the first peak 32 of the character waveform may, because of the intensity of the ink, take the form of a high intensity peak 34 or a low intensity peak 36. If applying a fixed threshold ($T_F$) to either of the peaks 34 and 36, it will be seen that the location of the start of the intensity peaks $P_H$ and $P_L$ for the respective peaks 34 and 36 will vary which severely degrades the recognition operation since the peak positions of the waveform are shifted horizontally out of their proper windows. The present invention thus includes the generation of adaptive thresholds ($T_{AH}$) ($T_{AL}$) for the respective peaks 34 and 36 which, as shown in FIG. 2, while intersect the character waveform in the same location ($P_A$) regardless of the intensity of the waveform. For purposes of simplifying the present disclosure, the intensity peak line $P_A$ of FIG. 2 has also been designated as representative adaptive threshold ($T_A$) so as to hereinafter define either one or both of the high and low intensity peaks 34 and 36 illustrated. In addition, such adaptive threshold in each instance reduces the effects of respective noise peaks 34a and 36a which may normally be encountered in the first peak of the character waveform.

Figure 7:
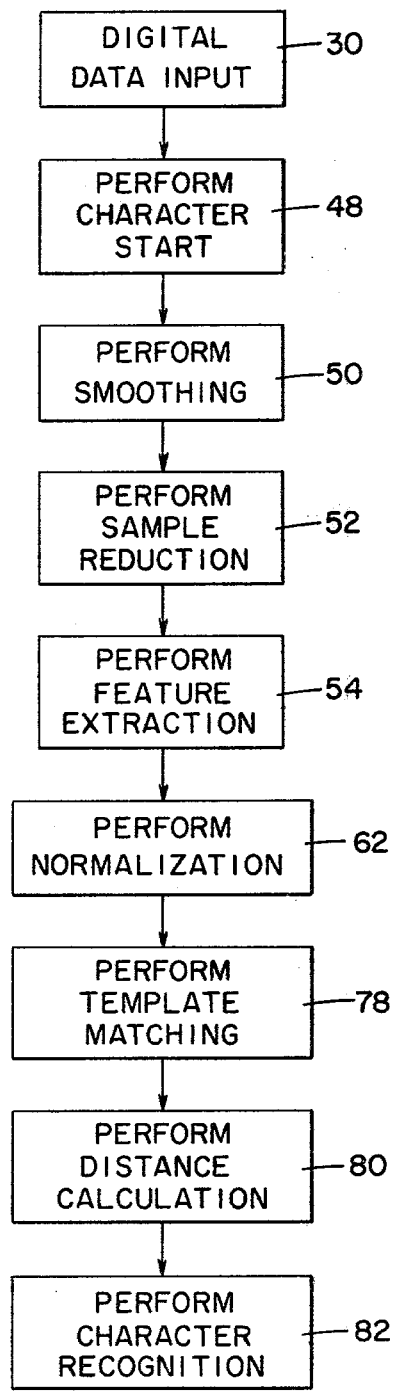
FIG. 7 is a flowchart of the general overall operation of the recognition system in accordance with the present invention.

Again referring to FIG. 1, the comparator circuit 28 will compare the amplitude of each sample outputted by the 8-bit A/D converter 26 with a fixed threshold and will output the amplitudes of those samples which exceed the fixed threshold for storage in an accumulator circuit 38 under the control of logic circuit 39. A counter 40 will count the number of samples that are stored in the accumulator 38. The comparison of the samples being outputted by the A/D converter 26 will continue until the end of the peak 32 (FIG. 2) is detected, at which time the count outputted by the counter 40 is stored in a buffer 42 while the sum appearing on the output of the accumulator 38 is stored in a buffer 44. A processor 46, such as a SIGNETICS 8×300, coupled to the buffers 42 and 44 will divide the sum of the samples stored in the buffer 44 by the count appearing in the buffer 42 to arrive at the value level of the adaptive threshold ($T_a$). As shown in the flowchart of FIG. 7, after receiving the data by block 30 from the buffers 42, 44 (FIG. 1), the processor 46 will subtract the amplitude of the adaptive threshold from each of the samples outputted by the A/D converter 26 until the start of the character waveform (block 48) is detected. The processor 46 will then store the amplitudes of the samples taken by the A/D converter 26 of the character waveform (FIG. 6). The samples stored are then smoothed and reduced (blocks 50 and 52 of FIG. 7) by adding the amplitudes $Y_1$ and $Y_2$ of two adjacent samples and dividing by two (FIG. 5B) to arrive at the maximum amplitude ($Y_1'$) of the samples, which value is to be subsequently used in determining the peaks of the unknown character waveform 32 (FIG. 2).

Figure 8:
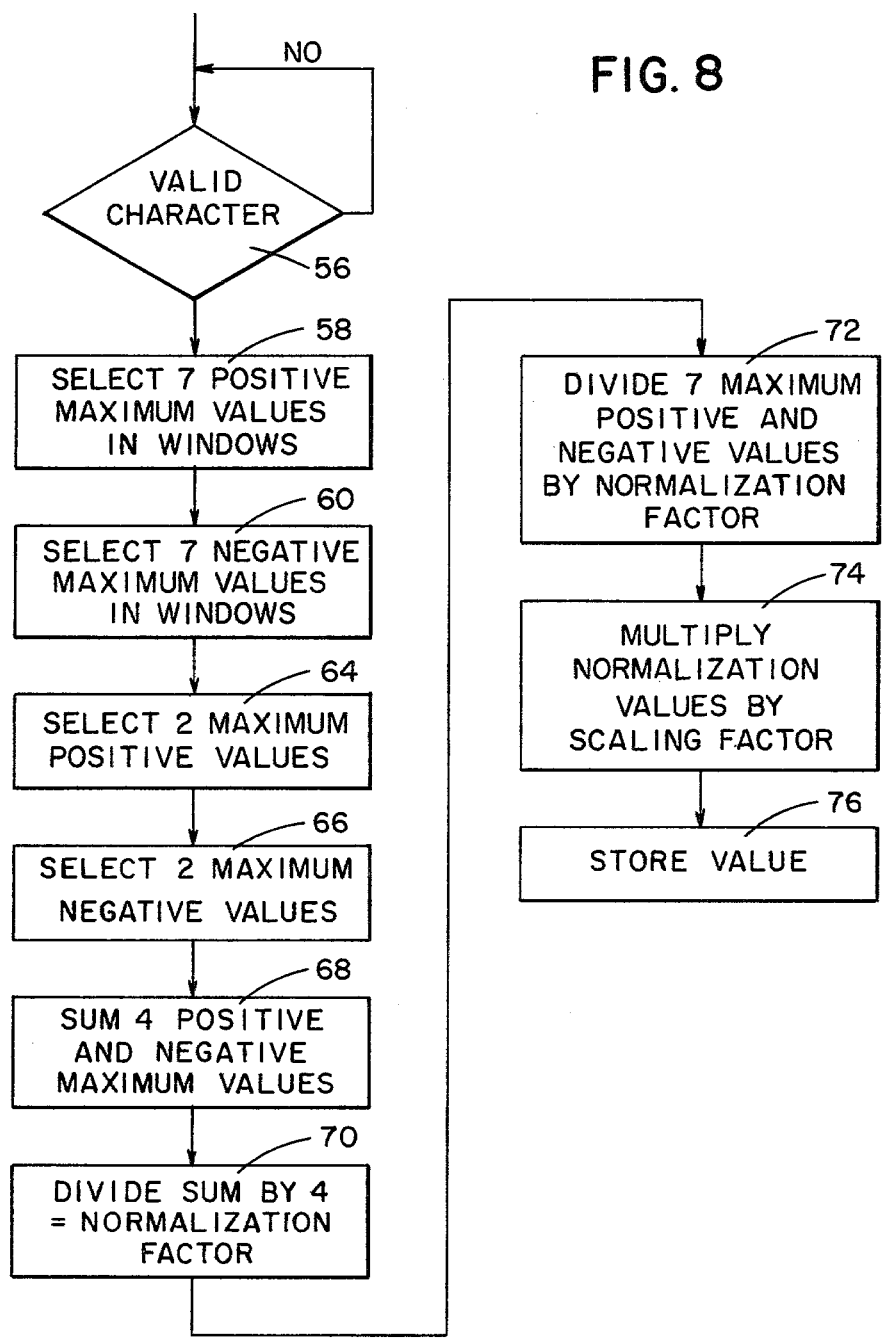
FIG. 8 is a flowchart of the general overall operation of said recognition system in extracting the samples having maximum amplitudes in each window and normalizing the extracted samples.

To perform recognition or classification of E-13B character waveforms, features or segments must be extracted from the waveforms. These features must contain all the relevant information to allow any one E-13B character waveform to be distinguished from any other such waveform despite severe distortion of the waveforms. As shown in recognition system flowchart of FIG. 8, in extracting and normalizing the maximum amplitude samples or features from the samples outputted by the A/D converter 26 (FIG. 1), the processor 46 has determined that a valid character is present as a result of the generation of the adaptive threshold (block 56). The processor 46 will then apply a plurality of windows to the features extracted from the waveform 32, the location of each of which windows is shown in FIG. 6. The features extracted from the segmented E-13B character waveform 32 (FIG. 2) are the maximum values corresponding to the peaks in the waveform 32 and their positions in the windows. The features are separated into positive and negative values for recognition and it is to be noted that the feature position in each window is measured relative to the first (i.e. character start) sample ($Y_1$).

As shown in FIG. 6, there are seven positive and seven negative windows. Positive window #1 ($+W_1$) is five samples wide due to the character start thresholding of a portion of the first peak. As further shown in FIG. 6, between the windows are also "dead samples". The purpose of this intercharacter dead time is to cover up noise or character waveform overflow beyond the character window (i.e. between characters) which might cause false character starts and hence performance degradation. In extracting the maximum features in each of the windows $W_1$-$W_7$ (FIG. 6), the processor 46 will select the seven positive maximum values in windows $+W_1$-$+W_7$ and the seven negative maximum values in windows $-W_1$-$-W_7$ (blocks 58 and 60 of FIG. 8) and store the values.

As is well-known in the art, E-13B characters are printed with ink that results in the waveforms which represent the characters, each waveform having "built-in" amplification factors. The actual amplitude of character waveforms can vary from character to character due to ink intensity. The amplification factor, due to ink intensity alone, does not carry any information as to identification of the character represented by the waveform. The majority of the information in the waveform, which defines the character, consists of the relative amplitudes and positions of the waveform peaks. Any peak amplitudes in a E-13B waveform are a function of two variables, shape and ink intensity. In order to eliminate ink intensity as a factor in the recognition operation, a normalization factor (N.F.) is generated which enables that the amplitude of every peak or feature in the waveform is exactly equal to the amplitude of every equivalent peak or feature in the same waveform where the the ink intensity is at a 100% level. In normalizing the features stored as a result of the feature extraction operation just performed, the processor 46 will select the two maximum positive values of the features stored (block 64 of FIG. 8) and the two maximum negative values (block 66). The processor will then sum the four values (block 68) and divide the sum by four to arrive at a normalization factor (NF) (block 70). The processor will then divide each of the seven positive and seven negative values by the normalization factor (NF) (block 72) and then multiply the normalized values by a scaling factor (block 74). The scaling factor in the present embodiment has the value of fifty-four which brings the normalized values back into full scale. The processor 46 will then store the values (block 76 of FIG. 8) for subsequent transmission to a template matching unit 47 (FIG. 1) which will correlate each of the normalized features outputted by the processor 46 to a plurality of templates each representing a known character (block 78 of FIG. 7).

Where a feature representing a peak falls outside the windows during the template matching, the distance between the peak and the window is summed (block 80 of FIG. 7), which sums are used by a character recognition processor 49 (FIG. 1) in recognizing the unknown character (block 82 of FIG. 7). For a more detailed description of the construction and operation of the template matching and the character recognition operation, reference should be made to the previously-referenced co-pending patent application by Nally et al.

Figure 3A:
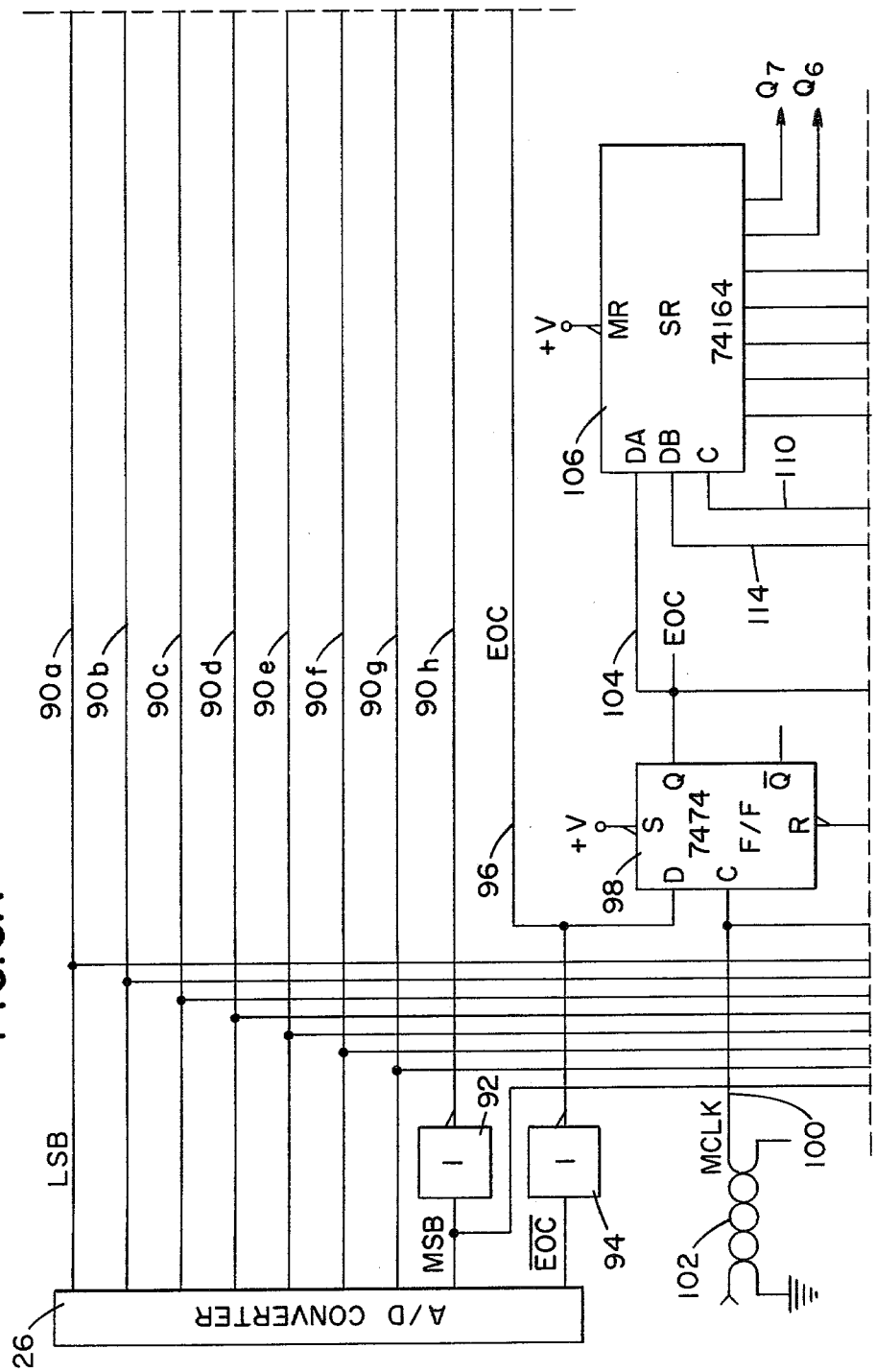

Referring now to FIGS. 3A–3I inclusive, as arranged in the manner shown in FIG. 4, there is disclosed logic circuits generating the signals representing the sum of the amplitudes of the samples taken under the peak 32 (FIG. 2) by the A/D converter 26 together with the number of samples taken. These signals are transmitted to the processor 46 (FIG. 1) which divides the sum of the amplitudes of the samples by the number of samples to arrive at the voltage level of the adaptive threshold ($T_a$). As shown in FIG. 3A, the A/D converter 26 will output eight bits of data over lines 90a–90h inclusive representing a sample of the analog waveform outputted by the read head 20 (FIG. 1) representing the unknown character. The least significant bit (LSB) of the data appears on line 90a while the most significant bit (MSB) is transmitted to an inverter 92 and appears on line 90h. The A/D converter 26 will also output an end-of-conversion signal $\overline{EOC}$ which when low signals the end of the A/D converter 26 operation.

The signal $\overline{EOC}$, which is high at this time, is transmitted through an inverter 94 over line 96 (FIGS. 3B and 3C) to the processor 46 (FIG. 1) notifying the processor that the A/D converter 26 is starting to output samples of a character waveform. The inverted signal EOC is also transmitted over line 96 to the D input of a #7474 flip-flop 98 (FIG. 3A) which, upon receiving the clock signal MCLK over line 100 from a master clock source 102, clocks the high signal EOC out of the Q output to a #74164 shift register 106. The shift register 106 receives the clock signal MCLK transmitted over line 100 through an inverter 108 (FIG. 3D) and over line 110 to the shift register 106 which outputs a plurality of phase clock signals $Q_1$–$Q_7$ inclusive for use in clocking various logic circuits in a manner that is well-known in the art. The shift register 106 also receives a control signal from a #7474 flip-flop 112 (FIG. 3D) which is reset by the signal EOC appearing on line 104 enabling a low signal appearing on the $\overline{Q}$ output of the flip-flop to be transmitted over line 114 to the shift register 106 (FIG. 3A). The flip-flop 112 is reset by the clock signal $\overline{Q_1}$ which is the output of an inverter 116 (FIG. 3B) connected to the Q clock line 118 of the shift register 106.

The eight bits of data appearing on the data lines 90a–90h inclusive and representing a sample of the character waveform are transmitted (FIGS. 3A, 3B and 3C) to an output buffer comprising a pair of #8T98 tri-state buffers 115 and 117 (FIG. 3C) which continuously transfer the output data from the A/D converter 26 over output lines 120a–120h inclusive to the processor 46 (FIG. 1), which in turn stores each 8-bit sample outputted by the converter 26 in a RAM located in the processor 46. As will be described more fully hereinafter, the processor 46 will apply the adaptive threshold ($T_a$) (FIG. 2) to each of the samples stored in such processor RAM to arrive at the start of the character waveform.

Figure 3C:
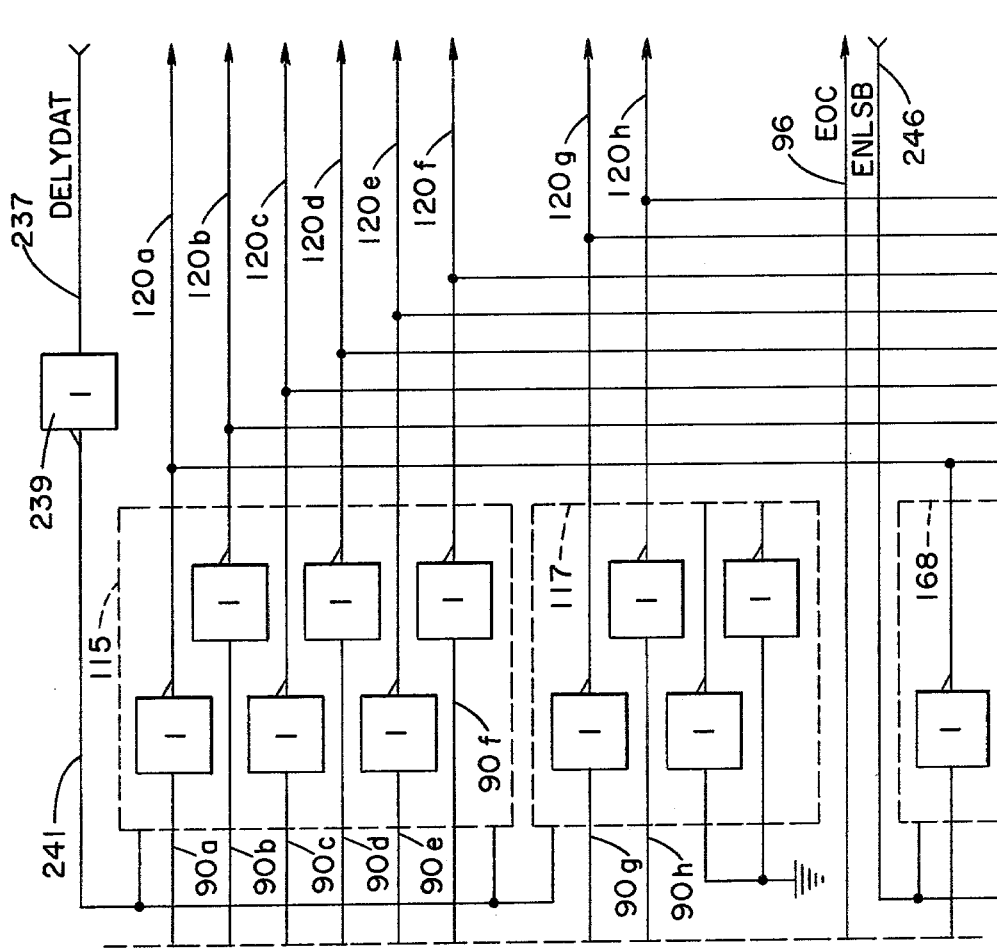
Figure 3D:
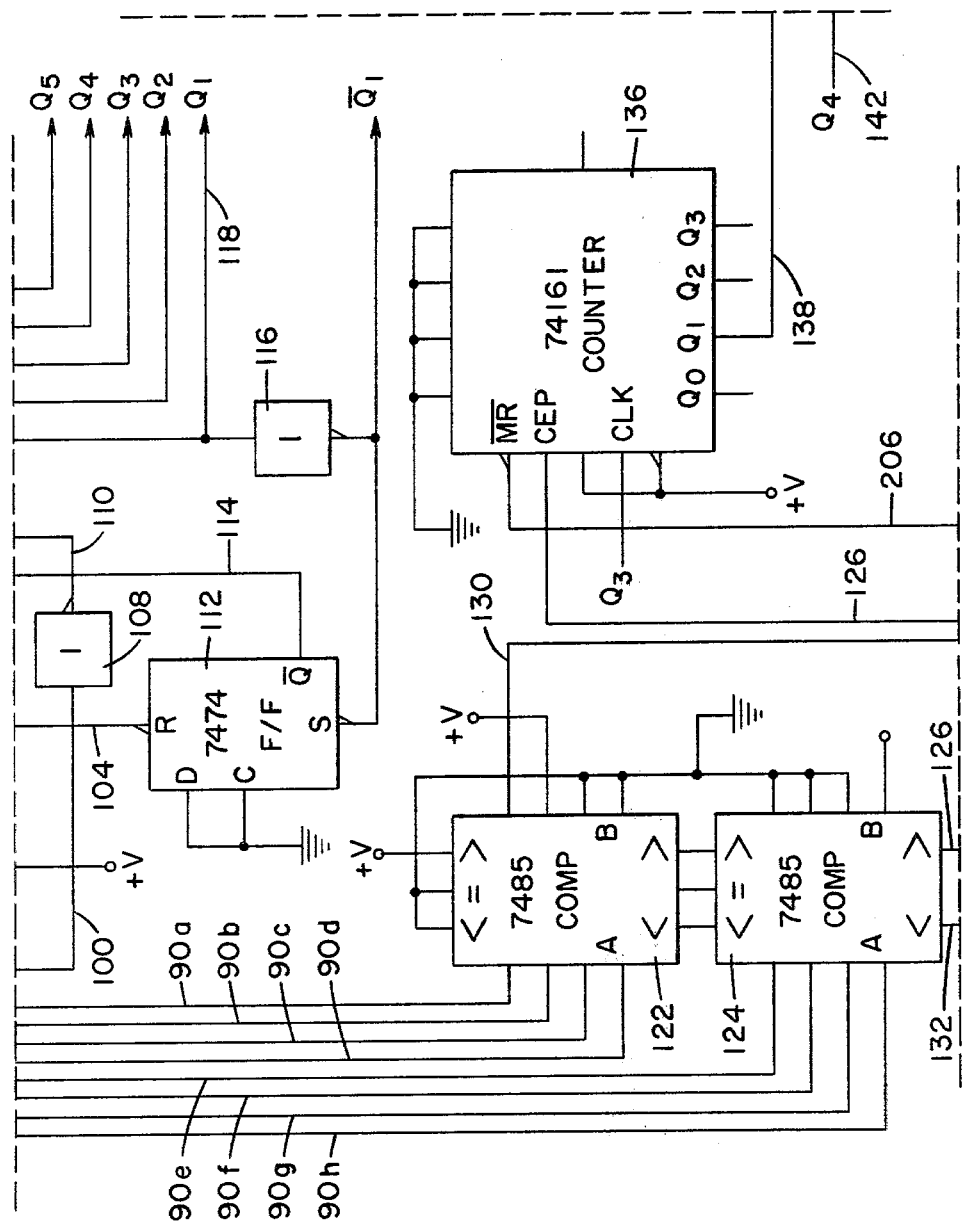
Figure 3E:
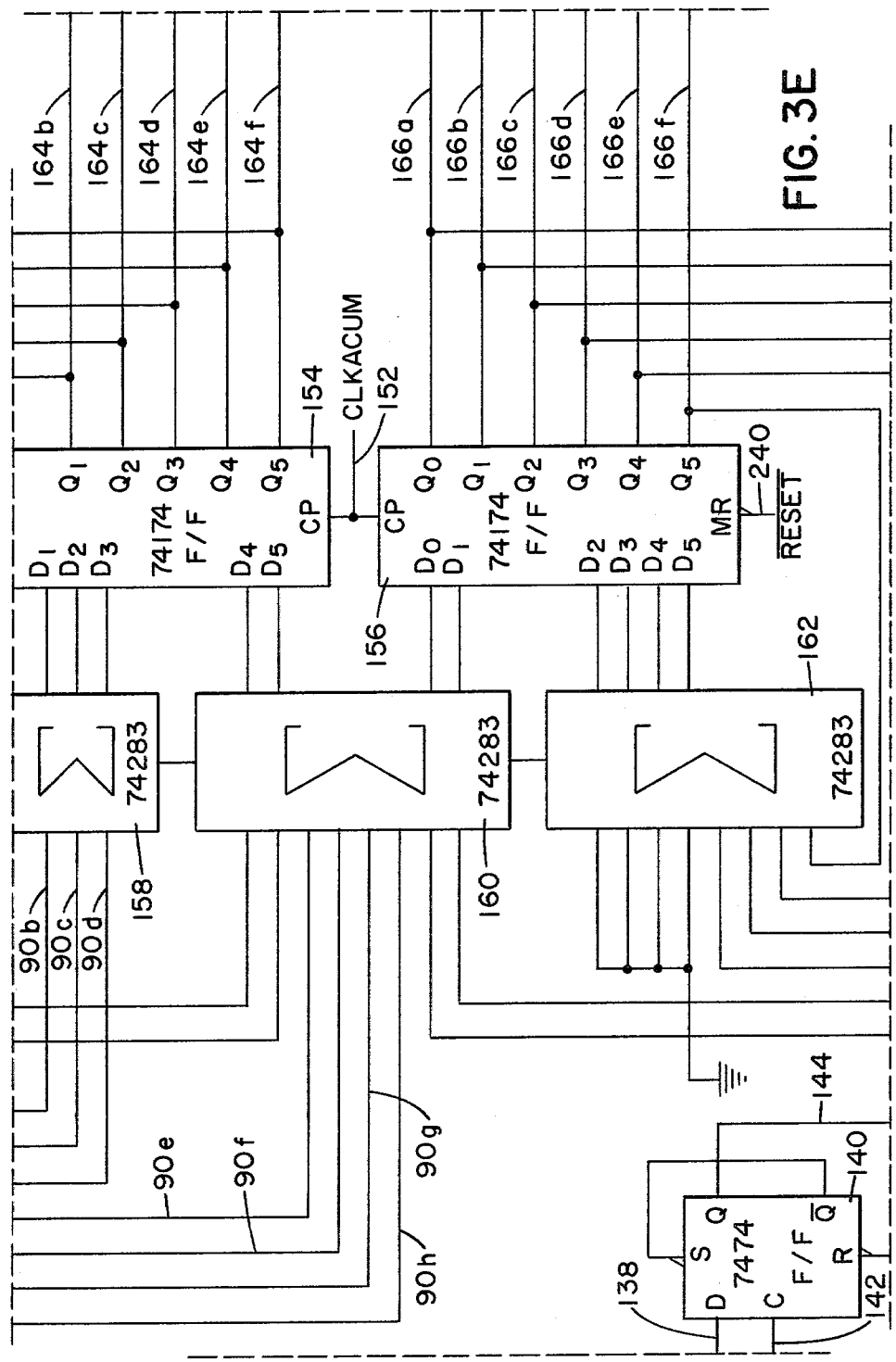
Figure 3F:
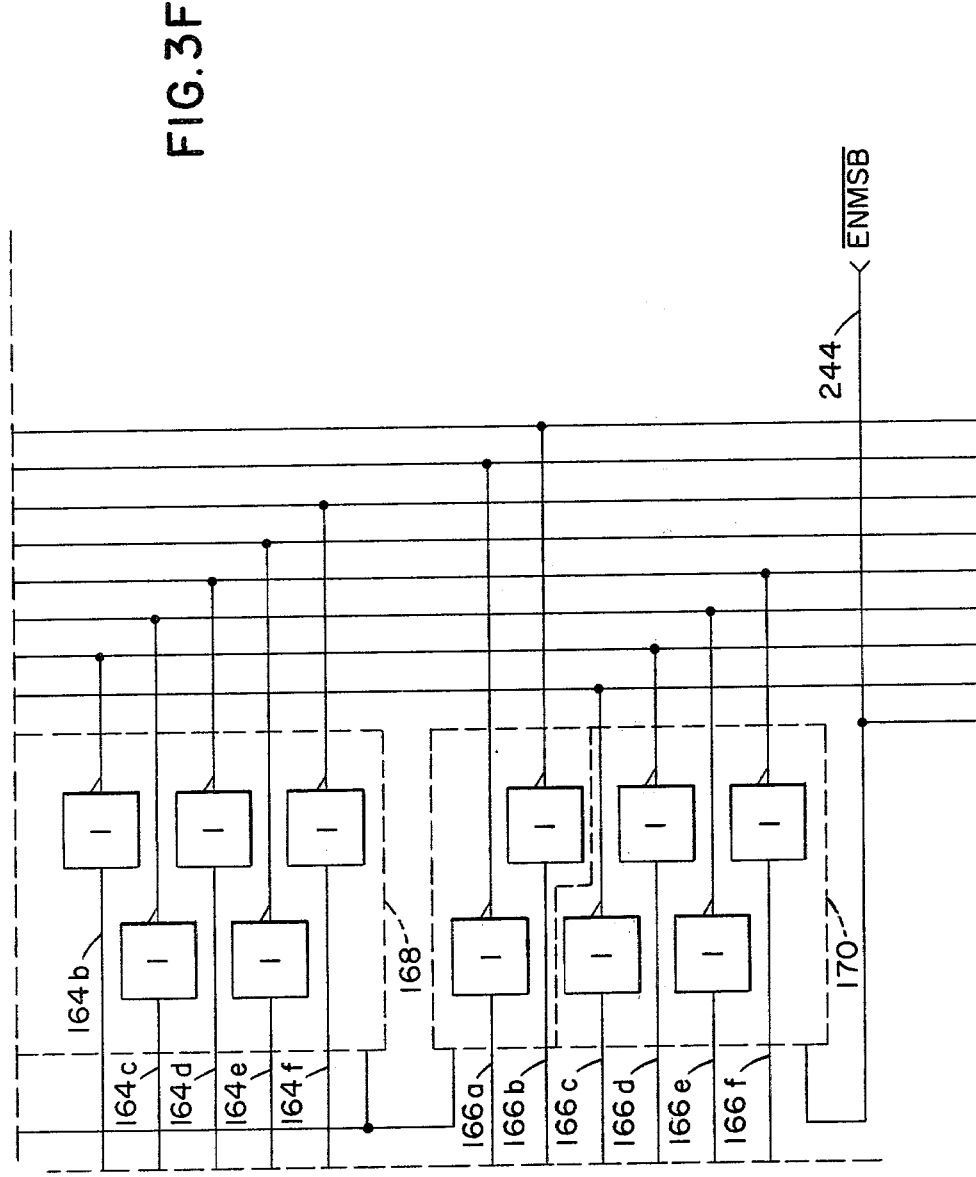
Figure 3G:
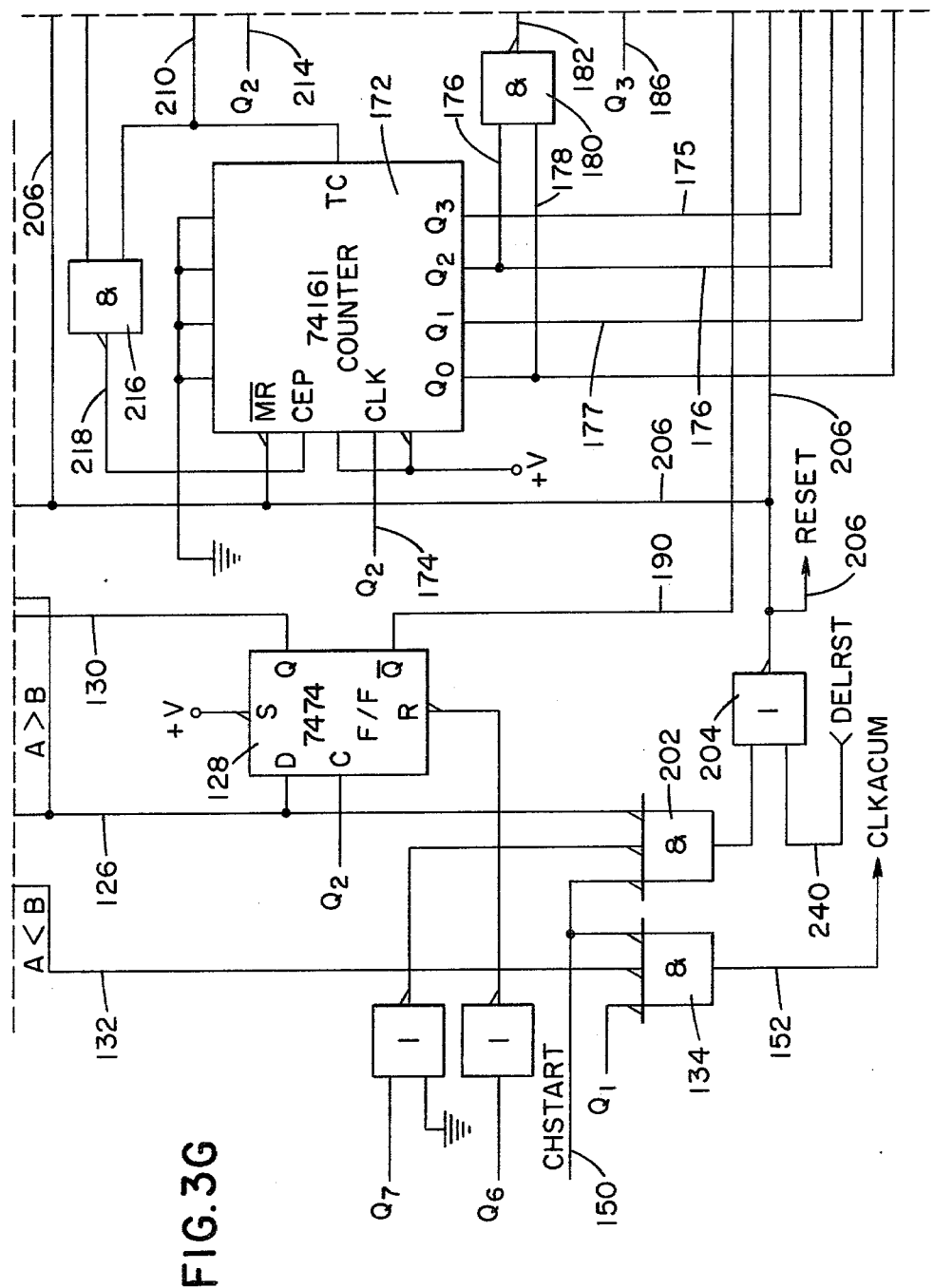

The data bits appearing on lines 90a–90h inclusive (FIGS. 3A and 3B) are also transmitted to a pair of #7485 4-bit comparators 122 and 124 (FIG. 3D) which will compare each 8-bit sample appearing at the A inputs with a fixed threshold appearing at the B inputs. In the present example, the comparators 122 and 124 are wired to initiate a comparison operation with the amplitude value of 2 appearing at the B inputs. If the value of the data representing the amplitude of the sample is greater than 2, a high signal will appear on the output line 126 (FIGS. 3E and 3G) of the comparator 124, which signal is transmitted to the D input of a #7474 flip-flop 128 (FIG. 3G). Upon the occurrence of the next clock signal $Q_2$, a high signal will appear at the Q output of the flip-flop 128 for transmission over line 130 (FIG. 3G and 3E) to the B inputs of the comparator 122 which changes the signal level from a 2 to a 3. Subsequent data samples appearing at the A inputs of the comparators 122 and 124 will keep the signal high on line 126 indicating that the samples being outputted by the converter 28 are samples of the first peak of a valid character waveform. The amplitude value of 3 is selected to distinguish between the actual peak of the character waveform or noise. If, when comparing the data samples appearing at the A input of the comparators 122 and 124 with the signal level appearing at the B input, a high signal appears on line 132 (FIGS. 3E and 3G) of comparator 124 indicating the amplitude of the sample appearing at the A inputs of the comparators 122 and 124 is less than 3 and is therefore a noise peak of the type (34a or 36a) shown in FIG. 2, the high signal appearing on line 132 will be transmitted to an inverting input of an AND gate 134 (FIG. 3G) whose output signal clock accumulator (CLK ACCUM) will be low, thereby disabling the character start operation in a manner that will be described more fully hereinafter. The logical elements disclosed in the present application are commercially available from the Texas Instruments Corporation of Dallas, Tex.

If the signal on line 126 remains high indicating the samples outputted by the A/D converter 26 (FIG. 1) represent the first peak 32 (FIG. 2) of a valid character waveform, the high signals are transmitted over line 126 (FIG. 3D) to a #74161 counter 136 (FIG. 3B) which starts counting the samples outputted by the converter 26 (FIG. 1) found to have an amplitude above the value of 3. Upon the count reaching 2, the $Q_1$ output line of counter 136 will go high which signal is transmitted over line 138 to the D input of a #7474 D-type flip-flop 140 (FIG. 3E). Upon the occurrence of the next clock signal $Q_4$ on line 142 (FIGS. 3D and 3E), the flip-flop 140 will clock a high signal over its Q output line 144 (FIGS. 3E and 3H) to an input whose NAND gates 146 and 148 (FIG. 3H) condition the gates for operation in a manner that will be described hereinafter.

As described previously, upon the amplitude of the samples appearing at the A inputs of comparators 122 and 124 being greater than 2, the signal appearing on line 132 (FIGS. 3D and 3G) will be low, which signal is transmitted to an inverting input of the AND gate 134 on whose other inputs will appear the low signal CHSTART on line 150 and the clock signal $\overline{Q_1}$. Upon the occurrence of these low signals, the AND gate 134 will output the high signal CLKACUM over line 132 to the clock inputs of a pair of #74174 flip-flops 154 (FIGS. 3B and 3E) and 156 (FIG. 3E) which will latch the outputs of a plurality of #74283 adders 158, 160 and 162 (FIGS. 3B and 3E) during the time the clock signal $\overline{Q_1}$ goes low.

As shown in FIGS. 3B, 3E and 3H, the inputs to the adders 158–162 inclusive are coupled to the output of the flip-flops 152 and 154 and the input lines 90a–90h inclusive over which appears the amplitudes of the samples outputted by the A/D converter 26. It is thus seen that the adders 158–162 inclusive and the flip-flops 152 and 154 function to accumulate the amplitude of the samples outputted by the A/D converter 26, which sum is transmitted over the output lines 164a–164f and 166a–166f inclusive (FIGS. 3B, 3C, 3E and 3F) to a pair of #8T98 tri-state buffers 168 and 170 (FIGS. 3C and 3F).

As previously described, the counter 136 (FIG. 3D) will latch the flip-flop 140 (FIG. 3E) upon reaching a count of 2 after the comparators 122 and 124 (FIG. 3D) have started comparing the amplitudes of the incoming samples with a fixed threshold of 2. Upon the outputting of the first sample by the A/D converter 26 over lines 90a–90h inclusive (FIGS. 3A and 3D), a second #74161 counter 172 (FIG. 3G) will start to count the samples upon the occurrence of the $Q_2$ clock appearing on line 174. Upon the output count of the counter 172 reaching the count of 5, a high signal will appear on the output lines 176, 177 which are inputted into a NAND gate 180 resulting in the outputting of a low signal over line 182 to the D input of a #7474 flip-flop 184 (FIG. 3H). Upon the occurrence of the rising edge of the next clock pulse $Q_3$ appearing on line 186 (FIGS. 3G and 3H), the flip-flop 184 will output a high signal over its $\overline{Q}$ output line 188 to an input of the NAND gate 148. At this time a high signal will appear on the input line 144, of the NAND gate 148 which will be enabled when a high signal appears on the $\overline{Q}$ output line 190 (FIGS. 3G and 3H) of flip-flop 128 (FIG. 3G). This condition occurs when a low signal appears on line 126 of the comparator 124 (FIG. 3B) indicating that the amplitude of the input sample is less than the fixed threshold of 2 which in effect senses the end of the peak 32 (FIG. 2). Enabling of the NAND gate 148 will output a low signal to the inverting input of an OR gate 192 (FIG. 3H) whose output high signal over line 194 to the clock input of a #7474 flip-flop 196 (FIG. 3H) results in the outputting of a high signal CHSTART over its Q output line 150 and a low signal $\overline{CHSTART}$ over its $\overline{Q}$ output line 200. The signal CHSTART is transmitted over line 150 to the inverting inputs of AND gates 134 and 202 (FIG. 3G) disabling the signal CLKACUM and generating the signal RESET outputted by the NOR gate 205 (FIG. 3G) over line 206. The RESET signal resets the counters 136 (FIG. 3D), 137 (FIG. 3G) and the flip-flops 140 (FIG. 3E), and 184, 208, 196 (FIG. 3H) conditioning the logic circuits for another character start operation upon the signal $\overline{EOC}$ transmitted from the A/D converter 26 (FIG. 3A) going low.

If during the sampling of the first peak by the A/D converter 26, the counter 172 (FIG. 3G) reaches the count of 15, it will indicate that the peak being sampled is a high intensity peak 34 (FIG. 2). Upon reaching this count, the counter will output a high signal over line 210 to the D input of the flip-flop 208 (FIG. 3H) which in turn outputs a high signal over its Q output line 212 upon the occurrence of the rising edge of the next clock pulse $Q_2$ representing a sample count of 16 over line 214 (FIGS. 3G and 3H).

The high signals appearing on lines 210 and 212 are inputted into a NAND gate 216 whose output low signal over line 218 will disable the counter 172. The high signal appearing on line 212 is also transmitted to one input of the NAND gate 146 enabling the gate since the other inputs to the gate are high at this time. Enabling of the gate 146 results in a low signal being transmitted to the inverting input of the OR gate 192 which outputs a high signal over line 194 to clock the flip-flop 196 resulting in the generation of the character start signals CHSTART and $\overline{CHSTART}$ in the manner described previously.

The high signal appearing on line 212 is also coupled to one input of a #74273 flip-flop 220 (FIG. 3H) which is coupled to the output of the counter 172 over lines 175–178 inclusive. The flip-flop 220 is enabled by a clock signal generated by the clocking of the flip-flop 196 (FIG. 3H) in the manner described previously in which the signal $\overline{CHSTART}$ appearing on line 150 enables a NAND gate 222 whose other input is high at this time to output a low signal over line 224 to the inverting inputs of an AND gate 226 and thus enabling a high clock signal appearing on line 228 to latch the output count of the counter 172 appearing on line 175–178 inclusive. The count appearing on the output of the flip-flop 220 represents the number of samples outputted by the A/D converter 26 which occur during the sampling of the peak 32 (FIG. 2), the sum of which is stored in the flip-flops 154 and 156 (FIGS. 3B and 3E). The count appearing on the output of the flip-flop 220 is transmitted over lines 230 (FIGS. 3H and 3I) to a pair of #8T98 tri-state buffers 232 and 234 (FIG. 3I) during the transmission of the count to the processor 46 in a manner that will be described more fully hereinafter.

The outputting of the high signal CHSTART over line 150 upon the clocking of the flip-flop 196 (FIG. 3H) results in the signal being transmitted to a counter 236 (FIG. 3H) which in turn is coupled to a second counter 238 (FIG. 3I). The counters 236 and 238 are enabled by the high signal EOC appearing on line 96 (FIG. 3A) and outputted by the A/D converter 26 at the start of the sampling of the analog character signal. The counters 236 and 238 function as a time-out. After one millisecond, which is the time of one character length (FIG. 6), the counter 238 will output the reset signal DELRST over line 240 to the NOR gate 204 (FIG. 3G) enabling the gate to output the reset signal RESET over line 206 and thereby resetting the circuit.

The generation of the signal CHSTART over the output line 200 of flip-flop 196 will be transmitted to the processor 46 (FIG. 1) notifying the processor of a valid character start. In response to receiving the signal CHSTART, the processor raises the signal DELYDAT over line 237 (FIG. 3C) which is inverted by the inverter 239 and transmitted over line 241 to the buffers 115 and 117 disabling the buffers from transmitting the eight bits of data appearing on lines 90a–90h (FIG. 3A) to the processor 46. The processor will also generate the enabling signals ENSUM over line 242 (FIG. 3I) which enable the buffers 232 and 234 to output the sample count over lines 120a–120h inclusive (FIG. 3C) to the processor. In a similar manner, the enabling signals ENMSB and ENLSB are generated over lines 244 (FIG. 3F) and 246 (FIG. 3C) respectively, enabling the sum of the amplitudes of the samples to be transferred to the processor 46, thereby enabling the processor to store the samples of the actual character waveform in a manner to be described hereinafter. Since the amplitude sum being outputted by the flip-flops 154 and 156 (FIGS. 3B and 3E) is 12 bits long, the signal ENLSB is generated first for enabling the first 8 bits of the sum to be transferred to the processor followed by the generation of the signal ENMSB for transferring the remaining 4 bits to the processor. Once the processor 46 has established the adaptive threshold ($T_a$) (FIG. 2) in a manner that will now be described, the processor 46 will lower the signal DELYDAT over line 237 (FIG. 3C) enabling the buffers 115 and 117 to output the 8 bit sample of the unknown character waveform being transmitted over lines 90a–90h inclusive (FIG. 3A, FIG. 3B and FIG. 3C) from the A/D converter 26 (FIG. 1).

The signal ENMSB also clocks the flip-flop 220 (FIG. 3H) a second time through NAND gate 222 and the AND gate 226. Clocking of flip-flop 220 stores the output count of counter 172 (FIG. 3G) and flip-flop 208 up to a maximum count of a number equal to the number of templates used in the recognition system. This count represents the total number of first peak samples counted until the time the processor 46 responds to the generation of the signal CHSTART on line 200 (FIG. 3I).

The processor 46 includes an input RAM buffer that can store a maximum of 17 samples representing the first 17 samples required to establish a valid CHSTART signal. If there are more than 17 templates and if the intercharacter spacing is so small that the generation of the signal CHSTART with respect to the reading of a second character occurs while the processor 46 is still normalizing the data from the first character, the count of 17 could be exceeded before the processor is free to start the processing of the second character.

After responding to the signal CHSTART, first check the output count of the countr 172. If it is greater than 17, it rejects the character.

Referring now to FIGS. 9A–9F inclusive, there is shown a more detailed flowchart of the method by which the processor 46 (FIG. 1), using the data representing the sum of the amplitudes of the samples sensed in the first peak 32 (FIG. 2) of the analog waveform by the A/D converter 26 together with the number of samples sensed and received from the circuits disclosed in FIGS. 3A–3I inclusive, establishes the start of the character waveform and processes the amplitudes of the samples representing the peak positions of the character waveform in order to enable a character recognition apparatus of the type disclosed in the referenced copending patent application of Nally et al. to recognize a character.

As previously disclosed, the processor 46 is of a conventional design having various storage units such as shift registers, ROMs and RAMs together with a multiplier for multiplying data stored therein in a manner that is well-known in the art. As will be described more fully hereinafter, a number of the ROMs are structured to output the reciprocal of the data inputted into the ROM.

Referring now to FIG. 9A, the processor 46 will check the end of the conversion signal EOC (block 250) transmitted over line 96 (FIG. 3C) from the logic circuits and finding that the signal is low indicating the A/D converter 26 (FIG. 1) has completed its sampling of the analog waveform, the processor will store the 8-bit count (block 254) in a ROM structured to output the reciprocal of the inputted data. The processor will then transfer the 12-bits of data representing the sum of the amplitudes of the samples sensed to the multiplier (block 256) together with the 8-bits representing the sample count outputted from the reciprocal ROM (block 258). The processor will then multiply the two values (block 260), thereby effectively dividing the sum of the amplitudes by the number of samples sensed to derive the adaptive threshold ($T_a$) (FIG. 2) which is then used to find the start of the actual character waveform. The processor will then again check (block 262) the level of the signal EOC and finding that it is still low, the processor will then compare each sample with the adaptive threshold ($T_a$) (block 266) until it finds (block 268) a sample which is greater than the adaptive threshold which represents the start of the character waveform. The processor will then store (block 272) the remaining samples of the analog waveform in a RAM unit of the processor.

Figure 5A:
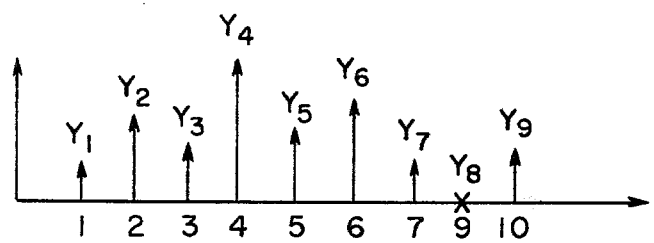
FIGS. 5A and 5B together define a schematic representation of the samples taken of the analog waveform at predetermined intervals before and after sample amplitude smoothing.
Figure 5B:
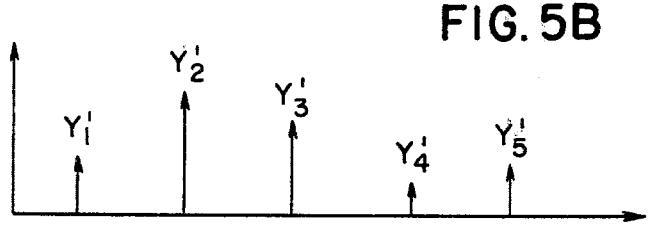
Figure 9B:
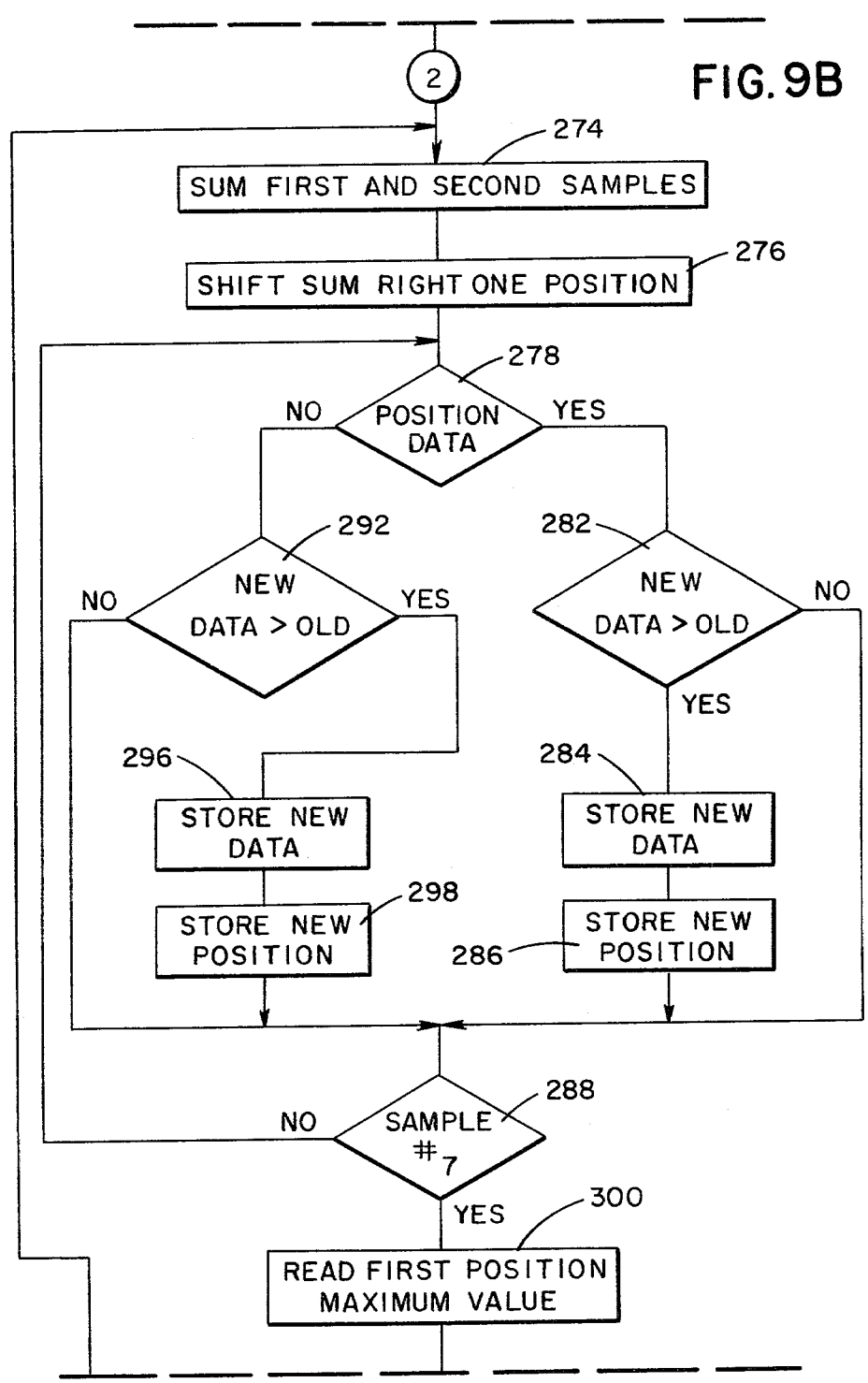
Figure 9D:
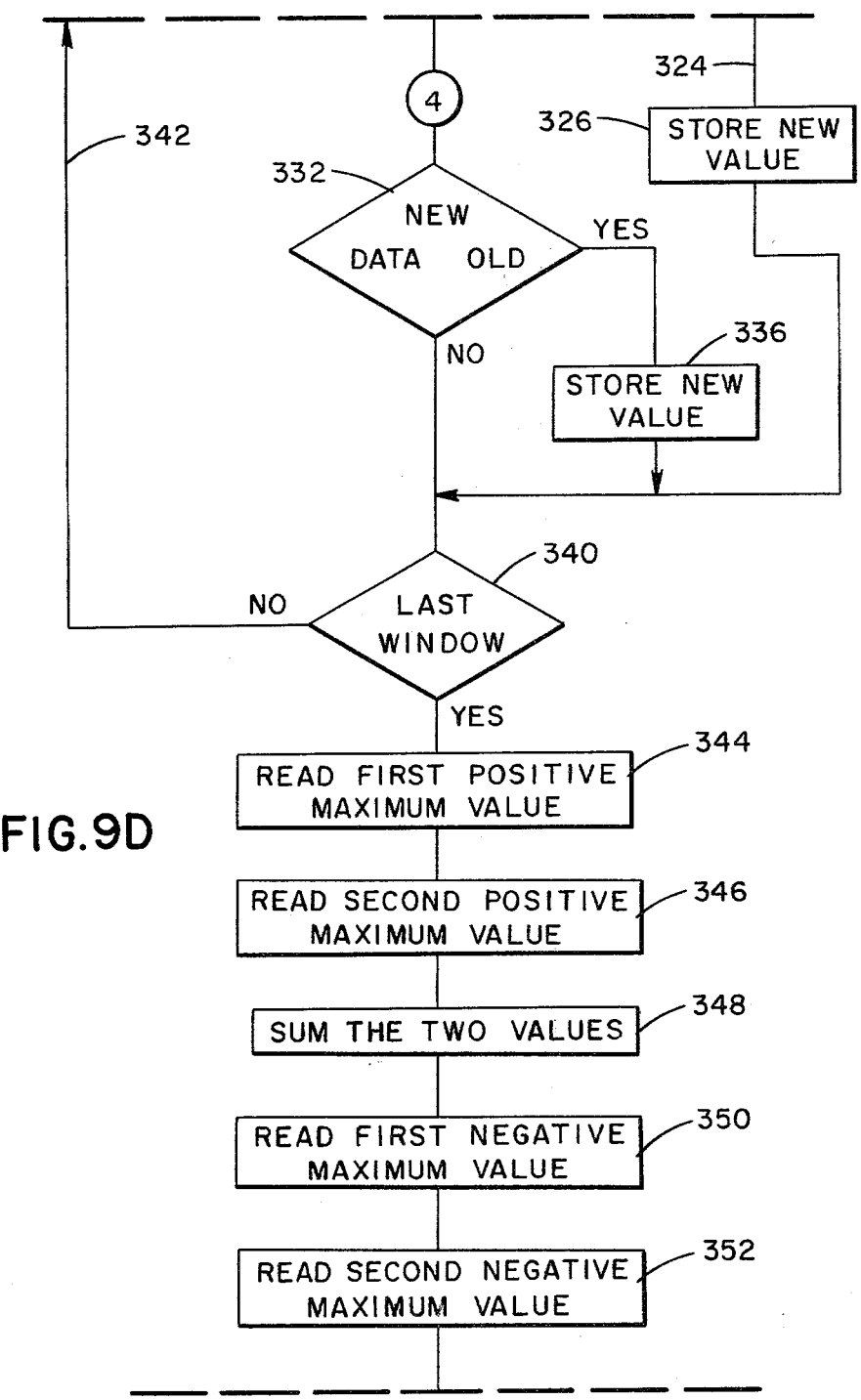

After establishing the start of the actual character waveform, the processor 46 will smooth the samples in each of the windows and extract the maximum amplitude sample representing the peak within that window. The processor will then normalize the extracted sample to compensate for ink intensity and applies a scaling factor (M) to compensate for the shape of the character being read. Referring to FIG. 9B, the processor sums the first and second adjacent samples (block 274) and shifts the storage position of the sum one direction to the right when storing the sum in a shift register (block 276). The shifting of the position of the sum in the shift register divides the sum by 2, thereby producing an average amplitude value of the two samples. As shown in FIGS. 5A and 5B inclusive, the number of samples now stored which represents the analog waveform have been reduced by one-half, which produces a more uniform curve. After the samples have been smoothed, the processor 46 then extracts from each of the windows (FIG. 6) the sample having the maximum amplitude. As shown in FIG. 6, there are seven positive windows ($+W_1-W_7$ inclusive) and seven negative windows ($+W_1--W_7$ inclusive) in which a feature sample or peak may occur. In extracting the maximum amplitude sample in each window, the system must determine whether it is a positive or negative.

In extracting the features from each window, the processor examines the average value stored in the shift register to determine if it is a positive (block 278 of FIG. 9B) or a negative value. If it is a positive value, the processor will compare the new value with a previously-existing value stored in a memory unit of the processor (block 282). If the value is greater than the previously-stored value, the processor stores the new value (block 284) and also stores the position (block 286) of the maximum value. If the average value stored in the shift register is negative, the processor will repeat the steps of comparing the average value with a value previously stored (block 292) and if it finds that it is greater than the previous value, it will store the new negative value (block 296) and the position (block 298) of the new value. The processor will then determine if the sample being examined is the seventh sample (block 288). If it is not the seventh sample, the processor will take the next positive or negative value and compare it with the previously-stored value to determine if the newly-examined sample has an amplitude greater than the previously-stored sample. This process will continue until all seven samples of the window have been examined and the sample having the maximum amplitude in the window is now stored in a RAM unit of the processor.

The processor will read the first positive maximum value stored in the RAM unit (block 300) and compare that value (block 302) (FIG. 9C) with a value stored in a second RAM unit. If the value of the new sample is greater than that value of the sample stored in the RAM unit, the processor will store (block 306) the new value in the RAM unit. If the new value is not greater than the previously-stored value, the processor will read the second maximum positive value (block 310) and compare that value with the value stored in the RAM unit. If the second value is greater than the value stored in the RAM unit, the processor will store (block 316) the new maximum positive value in the RAM unit.

If the maximum positive values are not greater than the previously-stored maximum values which represent the maximum values of the previously processed windows, the system will read the first negative maximum value (block 320) and compare (block 322) this new value with a value previously stored in a RAM unit. If the new value is greater than the previously-stored value, the processor will store (block 326) (FIG. 9D) the new data in the RAM unit. If the new value is not as great as the stored value, the processor will read the second maximum negative value (block 330) and compare this new value (block 332) with the value stored in the RAM unit. If the new value is greater than the stored value, the processor will store (block 336) the new value in the RAM unit. The processor then checks (block 340) to determine if the window processed is the last window ($W_7$) (FIG. 6). If it is not the last window, the processor will, over line 342 (FIGS. 9B, 9C and 9D), go to the next window and start comparing the maximum positive and negative amplitude values so that at the end of the seventh window, the first and second maximum values of the positive and negative samples of the template are now stored in a RAM unit located in the processor.

To normalize the values stored in the RAM unit, the processor will read the first positive maximum value (block 344) and the second positive maximum value (block 346). The processor will then sum the two values (block 348) and store the sum in a memory portion of the processor. The processor will then read the first (block 350) and second (block 352) maximum negative values. To derive a normalization factor (N.F.), the processor sums the two positive and two negative maximum values (block 354) (FIG. 9E) and divide the sum by 4. This latter operation is accomplished by storing the sum of the two positive and two negative values in a shift register and shifting the storage location of the sum two places to the right, thereby producing the normalization factor (N.F.) (block 356). The processor will then store the normalization factor into a reciprocal ROM (block 358) which outputs the reciprocal of the value inputted into the ROM. The processor then loads the reciprocal values (block 360) into a multiplier together with a scaling factor (block 362) which, in the present embodiment, is arbitrarily set as the numeral 54. The processor then multiplies both values (block 364) to produce a scaled normalization factor (S.N.F.) (block 366) which is used to bring the peak values within a normal voltage range.

Figure 9F:
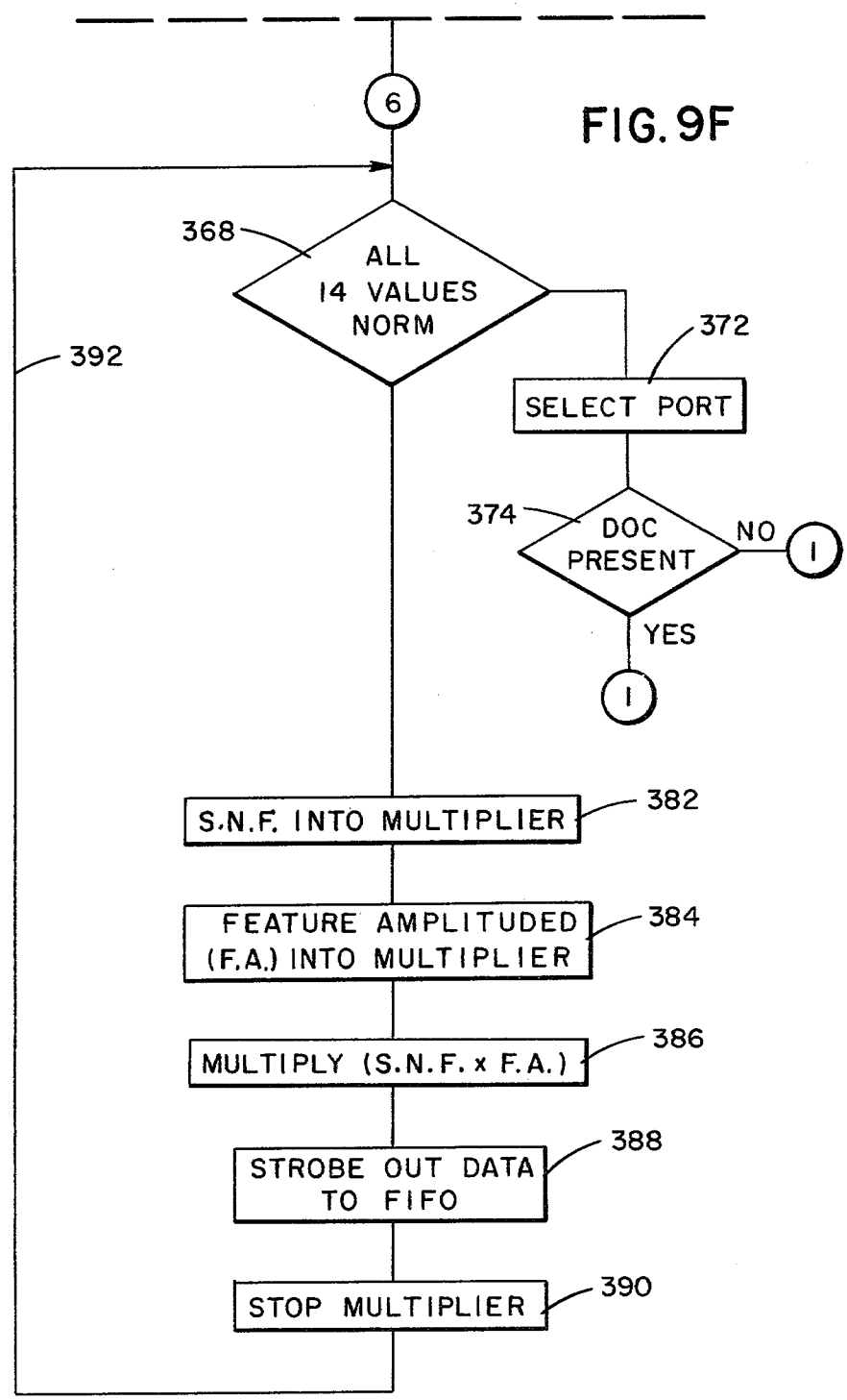

To complete the normalization and scaling operation, the processor multiplies each of the fourteen values representing the first and second maximum amplitudes in each of the seven positive and seven negative windows. The processor first checks to see if all fourteen values have been normalized (block 368) (FIG. 9F). If all the values have not been normalized, the processor will transmit the scaled normalized factor (S.N.F.) (block 382) to the multiplier together with the next maximum amplitude sample (block 384). The processor will then multiply (block 386) the two values and strobes out the result to a first-in, first-out (FIFO) storage unit (block 388), from where the data is outputted to a template matching unit as fully described in the co-pending patent application of Nally et al. Docket No. 2939. The processor 46 will then stop the multiplication operation (block 390) and check again (block 368) to see if all fourteen values have been normalized. If this is true, the processor then selects an input port (block 372) to determine if a document is present (block 374) adjacent the read head 20 (FIG. 1) and then returns to a ready state where it will be checking the status of the signal EOC (block 250) (FIG. 9A).

Below is a group of program listings in Signetics 8×300 assembly language for the system operation described above.

|  | PROG | MICR |
|---|---|---|
|  | OBJ | R |
| FOLLOWING ARE THE PORT DEFINITIONS | | |
| STAT | RIV | 1,3,4 |
| DOCPNT | RIV | 1,2,1 |

-continued

| | PROG OBJ | MICR R |
|---|---|---|
| FOLLOWING ARE THE PORT DEFINITIONS | | |
| EOC | RIV | 1,1,1 |
| EOCBAR | RIV | 1,φ,1 |
| CHSTRT | RIV | 1,3,1 |
| RESULT | RIV | 2,7,8 |
| MAGR | RIV | 2,φ,1 |
| SAMNUM | RIV | 2,3,4 |
| WINUMR | RIV | 2,7,4 |
| SHIFTC | RIV | 2,7,3 |
| SHIFTD | RIV | 2,4,5 |
| SHIFTE | RIV | 2,7,5 |
| SHIFTF | RIV | 2,2,3 |
| OUTPUT | RIV | 2,7,7 |
| MULTY | RIV | 4,7,8 |
| DATA | LIV | 1,7,8 |
| INDAT | LIV | 1,7,4 |
| SIGN | LIV | 1,φ,1 |
| VALUE | LIV | 1,7,8 |
| CONTRL | LIV | 2,7,8 |
| ENABLE | LIV | 2,3,4 |
| MCD | LIV | 2,7,4 |
| RESET | LIV | 2,6,1 |
| STROBE | LIV | 2,7,1 |
| READY | LIV | 2,4,1 |
| TEMRST | LIV | 2,6,2 |
| MEMRY | LIV | 3,7,8 |
| SHIFTA | LIV | 3,7,6 |
| SHIFTB | LIV | 3,1,2 |
| MAGL | LIV | 3,φ,1 |
| RDBAR | LIV | 3,7,1 |
| WRITE | LIV | 3,6,1 |
| ADRES | LIV | 3,5,3 |
| WINUML | LIV | 3,7,4 |
| IMEMRY | LIV | 3,7,5 |
| | ORG | φφφ |
| | JMP | RESTXM |
| PWRUP | SEL | MEMRY |
| | SEL | MULTY |
| | XMIT | φφ1H,IMEMRY |
| | SEL | CONTRL |
| | XMIT | φ17H,ENABLE |
| | XMIT | φφ6H,MCD |
| | SEL | STAT |
| DOC | NZT | DOCPNT,DOC |
| | XMIT | φφφH,TEMRST |
| | MOVE | AUX,AUX |
| | MOVE | AUX,AUX |
| | XMIT | φφ3H,TEMRST |
| START | NZT | DOCPNT,DOC |
| | NZT | CHSTRT,START |
| HOLD1 | NZT | EOC,HOLD1 |
| HOLD2 | NZT | EOCBAR,HOLD2 |
| | MOVE | AUX,AUX |
| | MOVE | AUX,AUX |
| | MOVE | AUX,AUX |
| | MOVE | AUX,AUX |
| INPUT | XMIT | φφ6H,ENABLE |
| | SEL | DATA |
| | MOVE | DATA,R5 |
| | SEL | CONTRL |
| | XMIT | φφ3H,ENABLE |
| | SEL | DATA |
| | MOVE | DATA,R3 |
| | SEL | CONTRL |
| | XMIT | φφ5H,ENABLE |
| | SEL | DATA |
| | MOVE | INDAT,R4 |
| | SEL | CONTRL |
| | XMIT | φφ6H,ENABLE |
| | SEL | DATA |
| | MOVE | DATA,R2 |
| | SEL | CONTRL |
| | XMIT | φ17H,ENABLE |
| | SEL | DATA |
| COMPAR | SEL | RESULT |
| | XMIT | 357H,AUX |
| | ADD | R2,RESULT |
| | NZT | RESULT,NEQUAL |
| EQUAL | JMP | FINDAV |
| NEQUAL | NZT | MAGR,LESS |

-continued

| | PROG OBJ | MICR R |
|---|---|---|
| FOLLOWING ARE THE PORT DEFINITIONS | | |
| GREATR | JMP | REJECT |
| LESS | SEL | STAT |
| HOLD3 | NZT | EOCBAR,HOLD3 |
| | XMIT | φφ1H,AUX |
| | ADD | R2,R2 |
| HOLD4 | NZT | EOC,HOLD4 |
| | JMP | COMPAR |
| REJECT | SEL | STAT |
| | NZT | CHSTRT,OUT |
| | JMP | REJECT |
| OUT | SEL | CONTRL |
| | XMIT | φφφH,R1 |
| | XMIT | 344H,R6 |
| REPEAT | NZT | R6,ZEROUT |
| | JMP | FINISH |
| ZEROUT | SEL | RESULT |
| | MOVE | R1,RESULT |
| | XMIT | φφ1H,STROBE |
| | XMIT | φφφH,STROBE |
| | XMIT | φφ1H,AUX |
| | ADD | R6,R6 |
| | JMP | REPEAT |
| | ORG | 113H |
| WAIT4 | SEL | STAT |
| | NZT | EOC,WAIT4 |
| WAIT5 | NZT | EOCBAR,WAIT5 |
| SAMPLE | SEL | DATA |
| | SEL | RESULT |
| | XMIT | 377H,AUX |
| | XOR | R5,R6 |
| | XMIT | φφ1H,AUX |
| | ADD | R6,AUX |
| | ADD | VALUE,RESULT |
| | NZT | MAGR,WAIT4 |
| | XMIT | 377H,R11 |
| | XMIT | φφφH,R2 |
| | SEL | CONTRL |
| | XMIT | φφφH,RESET |
| | MOVE | AUX,AUX |
| | XMIT | φφ1H,RESET |
| NEWIND | SEL | STAT |
| WAIT6 | NZT | EOC,WAIT6 |
| | XMIT | φφφH,R3 |
| | XMIT | φφφH,R5 |
| | JMP | NXTSAM |
| | MOVE | AUX,AUX |
| | MOVE | AUX,AUX |
| | MOVE | AUX,AUX |
| WAIT1φ | SEL | STAT |
| | NZT | EOC,WAIT1φ |
| | XMIT | φφ1H,AUX |
| | JMP | START |
| | ORG | 153H |
| CLRRAM | XMIT | φφφH,R1 |
| | SEL | MULTY |
| | SEL | MEMRY |
| | XMIT | φφ3H,IMEMRY |
| | MOVE | R5,MULTY |
| | XMIT | φφ7H,IMEMRY |
| | MOVE | R5,MULTY |
| | XMIT | φ13H,IMEMRY |
| | MOVE | R5,MULTY |
| | XMIT | φ17H,IMEMRY |
| | MOVE | R5,MULTY |
| | XMIT | φφ1H,IMEMRY |
| | JMP | LPDAT |
| | MOVE | AUX,AUX |
| | MOVE | AUX,AUX |
| | MOVE | AUX,AUX |
| | MOVE | AUX,AUX |
| NXTSAM | SEL | STAT |
| | SEL | DATA |
| WAIT7 | NZT | EOCBAR,WAIT7 |
| | MOVE | VALUE,R1 |
| | NZT | SIGN,MINUS |
| WAIT8 | NZT | EOC,WAIT8 |
| WAIT9 | NZT | EOCBAR,WAIT9 |
| | NZT | SIGN,DIFSIN |
| SAMSIN | MOVE | VALUE,AUX |

-continued

| | PROG OBJ | MICR R |
|---|---|---|
| | FOLLOWING ARE THE PORT DEFINITIONS | |
| | ADD | R1,R1 |
| | SEL | RESULT |
| | MOVE | R1(1),R1 |
| | MOVE | R1,OUTPUT |
| | MOVE | OVF,MAGR |
| | MOVE | RESULT,R1 |
| | NZT | MAGR,NEGPNT |
| POSV | XMIT | 377H,AUX |
| | XOR | R1,RESULT |
| | XMIT | φ2φH,AUX |
| | ADD | R2,R2 |
| | XMIT | φφ1H,AUX |
| | ADD | R11,R11 |
| | ADD | RESULT,AUX |
| | ADD | R3,RESULT |
| | NZT | MAGR,NWDAT |
| | JMP | POSNCK |
| NWDAT | MOVE | R1,R3 |
| | MOVE | R11,R4 |
| | JMP | POSNCK |
| NEGPNT | JMP | NEGV |
| | MOVE | AUX,AUX |
| | MOVE | AUX,AUX |
| MINUS | NZT | EOC,MINUS |
| WAIT11 | NZT | EOCBAR,WAIT11 |
| | NZT | SIGN,SAMSIN |
| DIFSIN | MOVE | VALUE,AUX |
| | ADD | R1,R1 |
| | SEL | RESULT |
| | MOVE | R1(1),R1 |
| | MOVE | R1,OUTPUT |
| | MOVE | OVF,MAGR |
| | XMIT | 1φφH,AUX |
| | XOR | RESULT,RESULT |
| | MOVE | RESULT,R1 |
| | NZT | MAGR,NEGV |
| | JMP | POSV |
| | MOVE | AUX,AUX |
| NEGV | XMIT | 377H,AUX |
| | XOR | R1,RESULT |
| | XMIT | φ2φH,AUX |
| | ADD | R2,R2 |
| | XMIT | 1,AUX |
| | ADD | R11,R11 |
| | ADD | RESULT,AUX |
| | ADD | R5,RESULT |
| | NZT | MAGR,POINT2 |
| | MOVE | R1,R5 |
| | MOVE | R11,R6 |
| POINT2 | JMP | POSNCK |
| MXACM1 | SEL | MULTY |
| MXACM2 | SEL | MEMRY |
| | XMIT | 377H,AUX |
| | XOR | R3,R1 |
| | XMIT | 1,AUX |
| | ADD | R1,R1 |
| | XMIT | φφφH,MEMRY |
| | MOVE | MULTY,AUX |
| | ADD | R1,MEMRY |
| | NZT | MAGL,LOADP1 |
| | XMIT | φφ4H,MEMRY |
| | MOVE | MULTY,AUX |
| | ADD | R1,MEMRY |
| | NZT | MAGL,LOADP2 |
| NEGMAX | XMIT | 377H,AUX |
| | XOR | R5,R1 |
| | XMIT | φφ1H,AUX |
| | ADD | R1,R1 |
| | XMIT | φ1φH,MEMRY |
| | MOVE | MULTY,AUX |
| | ADD | R1,MEMRY |
| | NZT | MAGL,NO2NEG |
| | JMP | LOADN1 |
| LOADP1 | XMIT | φφ7H,MEMRY |
| | MOVE | AUX,MULTY |
| | XMIT | φφ3H,MEMRY |
| | MOVE | R3,MULTY |
| | JMP | NEGMAX |
| LOADP2 | XMIT | φφ7H,MEMRY |

-continued

| | PROG OBJ | MICR R |
|---|---|---|
| | FOLLOWING ARE THE PORT DEFINITIONS | |
| | MOVE | R3,MULTY |
| | JMP | NEGMAX |
| LOADN1 | XMIT | φ17H,MEMRY |
| | MOVE | AUX,MULTY |
| | XMIT | φ13H,MEMRY |
| | MOVE | R5,MULTY |
| | JMP | FINWIN |
| | MOVE | AUX,AUX |
| | MOVE | AUX,AUX |
| | MOVE | AUX,AUX |
| | MOVE | AUX,AUX |
| NO2NEG | XMIT | φ14H,MEMRY |
| | MOVE | MULTY,AUX |
| | ADD | R1,MEMRY |
| | NZT | MAGL,FINWIN |
| LOADN2 | XMIT | φ17H,MEMRY |
| | MOVE | R5,MULTY |
| FINWIN | XMIT | φφ7H,AUX |
| | XOR | R2,MEMRY |
| | NZT | WINUML,DEDTM |
| | JMP | NRMFTR |
| DEDTM | XMIT | φφ1H,MEMRY |
| | XMIT | φφ1H,AUX |
| | ADD | R2,R2 |
| | ADD | R11,R11 |
| | ADD | R11,R4 |
| | ADD | R11,R6 |
| | XMIT | φ17H,AUX |
| | AND | R2,R2 |
| | JMP | NEWIND |
| | ORG | 4φφH |
| RESTXM | JMP | PWRUP |
| | MOVE | AUX,AUX |
| FINDAV | SEL | CONTRL |
| | SEL | MULTY |
| | MOVE | R3,MULTY |
| | MOVE | R4,MULTY |
| | MOVE | R5,MULTY |
| | MOVE | AUX,MULTY |
| | MOVE | AUX,AUX |
| | MOVE | AUX,AUX |
| | MOVE | AUX,AUX |
| | MOVE | AUX,AUX |
| | MOVE | AUX,AUX |
| | MOVE | AUX,AUX |
| | MOVE | MULTY,R5 |
| | JMP | SAMPLE |
| | ORG | 44φH |
| POINT3 | JMP | NXTSAM |
| POINT4 | JMP | ONETO6 |
| POSNCK | MOVE | R2,RESULT |
| | NZT | WINUMR,CHK7 |
| | XMIT | 12φH,AUX |
| | XOR | R2,RESULT |
| | NZT | SAMNUM,POINT3 |
| | JMP | CLRRAM |
| LPDAT | SEL | MULTY |
| | SEL | CONTRL |
| | MOVE | R3,MULTY |
| | SEL | RESULT |
| | MOVE | R4,RESULT |
| | XMIT | φφ1H,STROBE |
| | XMIT | φφφH,STROBE |
| | XEC | JMPTO(R1),φ |
| JMPTO | JMP | MXACM1 |
| | JMP | LNDAT |
| CHK7 | XMIT | φφ7H,AUX |
| | XOR | R2,RESULT |
| | NZT | WINUMR,POINT4 |
| | XMIT | 16φH,AUX |
| | XOR | R2,RESULT |
| | NZT | SAMNUM,POINT3 |
| LNDAT | SEL | CONTRL |
| | MOVE | R6,RESULT |
| | XMIT | φφ1H,STROBE |
| | XMIT | φφφH,STROBE |
| | SEL | MULTY |
| | MOVE | R5,MULTY |

|  | PROG<br>OBJ | MICR<br>R |
|---|---|---|
|  | FOLLOWING ARE THE PORT DEFINITIONS | |
|  | MOVE | AUX,AUX |
|  | JMP | MXACM2 |
| ONETO6 | XMIT | 16ϕH,AUX |
|  | XOR | R2,RESULT |
|  | NZT | SAMNUM,POINT5 |
|  | XMIT | ϕϕ1H,R1 |
|  | JMP | LPDAT |
| POINT5 | JMP | NXTSAM |
| NRMFTR | XMIT | ϕϕϕH,MEMRY |
|  | MOVE | MULTY,AUX |
|  | XMIT | ϕϕ4H,MEMRY |
|  | ADD | MULTY,R1 |
|  | XMIT | ϕ1ϕH,MEMRY |
|  | MOVE | MULTY,AUX |
|  | XMIT | ϕ14H,MEMRY |
|  | ADD | MULTY,R2 |
|  | XMIT | 377H,AUX |
|  | XOR | R2,R2 |
|  | XMIT | ϕϕ1H,AUX |
|  | ADD | R2,AUX |
|  | MOVE | OVF,R3 |
|  | ADD | R1,R1 |
|  | MOVE | OVF,R3 |
|  | MOVE | R1(2),R1 |
|  | MOVE | R1,SHIFTA |
|  | MOVE | R3,SHIFTB |
|  | MOVE | MEMRY,R1 |
|  | XMIT | ϕϕ1H,MEMRY |
|  | XMIT | ϕ66H,R2 |
|  | SEL | CONTRL |
|  | MOVE | R1,MULTY |
|  | MOVE | AUX,MULTY |
|  | MOVE | AUX,MULTY |
|  | MOVE | R2,MULTY |
|  | MOVE | AUX,AUX |
|  | MOVE | AUX,AUX |
|  | MOVE | AUX,AUX |
|  | MOVE | AUX,AUX |
|  | MOVE | AUX,AUX |
|  | MOVE | AUX,AUX |
|  | MOVE | AUX,AUX |
|  | MOVE | MULTY,R1 |
|  | MOVE | MULTY,R2 |
|  | MOVE | MULTY,R3 |
|  | SEL | RESULT |
|  | MOVE | R1(5),R1 |
|  | MOVE | R1,SHIFTC |
|  | MOVE | R2,SHIFTD |
|  | MOVE | RESULT,R1 |
|  | MOVE | R2(5),R2 |
|  | MOVE | R2,SHIFTC |
|  | MOVE | R3,SHIFTD |
|  | MOVE | RESULT,R2 |
|  | XMIT | 362H,R11 |
| SAMNRM | NZT | R11,CONTIN |
|  | JMP | FINISH |
|  | ORG | 571H |
| CONTIN | SEL | MULTY |
|  | MOVE | R1,MULTY |
|  | MOVE | R2,MULTY |
|  | MOVE | AUX,MULTY |
|  | MOVE | AUX,AUX |
|  | MOVE | AUX,AUX |
|  | MOVE | AUX,AUX |
|  | MOVE | AUX,AUX |
|  | MOVE | AUX,AUX |
|  | MOVE | AUX,AUX |
|  | MOVE | AUX,AUX |
|  | MOVE | MULTY,R4 |
|  | MOVE | MULTY,R5 |
|  | SEL | RESULT |
|  | MOVE | R4(3),R4 |
|  | MOVE | R4,SHIFTE |
|  | MOVE | R5,SHIFTF |
|  | XMIT | ϕϕ1H,STROBE |
|  | XMIT | ϕϕϕH,STROBE |
|  | XMIT | ϕϕ1H,AUX |
|  | ADD | R11,R11 |
|  | JMP | SAMNRM |

|  | PROG<br>OBJ | MICR<br>R |
|---|---|---|
|  | FOLLOWING ARE THE PORT DEFINITIONS | |
| FINISH | XMIT | ϕϕ1H,READY |
|  | MOVE | AUX,AUX |
|  | XMIT | ϕϕϕ,READY |
|  | SEL | STAT |
|  | NZT | DOCPNT,POINT6 |
|  | JMP | START |
| POINT6 | JMP | DOC |
|  | END | MICR |

While the preferred embodiment of the present invention has been described in detail for recognizing characters in a standard E-13B character font, the character recognition system could be easily adapted by a person of ordinary skill in the art to recognize characters and symbols from any standard character font without departing from the spirit of the invention. Furthermore, many of the changes and details of the preferred embodiment may be made without departing from the spirit or scope of the claims as defined in the appended claims.

What is claimed is:

1. A method for establishing the start of an analog waveform having a sequence of varying peak voltage amplitudes and times of occurrence of same corresponding to the configuration of a symbol being recognized comprising the steps of:

sampling portions of the first peak of the analog waveform to generate values representing the voltage amplitude of each portion;

summing the voltage amplitudes of the samples taken;

counting the number of samples taken of the first peak;

dividing the sum of the voltage amplitudes by the number of samples taken to produce a threshold voltage amplitude;

comparing the voltage amplitude of each sample with the threshold voltage amplitude;

and outputting the voltage amplitude of those samples taken to a utilizing device whose voltage amplitude exceeds the threshold voltage amplitude as representing the start of the symbol to be recognized.

2. A method for providing data derived from an analog waveform having a sequence of varying peak voltage amplitudes and time of occurrence of same corresponding to the configuration of a character being recognized comprising the steps of:

sampling portions of the first peak of the analog waveform to generate values representing the voltage amplitude of each portion;

summing the voltage amplitudes of the samples taken;

counting the number of samples taken of the first peak;

dividing the sum of the voltage amplitudes by the number of samples taken to produce a threshold voltage amplitude;

comparing the voltage amplitude of each sample with the threshold voltage amplitude;

storing the samples whose voltage amplitude exceed the threshold voltage amplitude;

summing the voltage amplitudes of adjacent samples;

dividing the sum of the voltage amplitudes of two adjacent samples by two to establish the average voltage amplitude value for the two adjacent samples;

and storing only one of the two adjacent samples.

3. The method of claim 2 further comprising the steps of:

(a) dividing each of samples stored by a normalization factor;

(b) multiplying the normalized samples by a scaling factor;

(c) and storing the scaled normalized samples.

4. In a character recognition system wherein a voltage having an analog waveform unique to each character to be read is generated, said unique waveform including a sequence of varying peak voltage amplitudes corresponding to the shape of the character being read, a system for processing signals representing feature characteristics of the character recognized, comprising:

means for generating signals each representing the voltage amplitude of a number of samples of the first peak of the waveform;

first means coupled to said signal generating means for outputting first digital signals representing the sum of the voltage amplitudes of the samples outputted by said signal generating means;

second means coupled to said signal generating means for outputting a second digital value representing the number of signals outputted by said signal generating means;

and means coupled to said first and second outputting means for dividing said first digital signal by said second digital signal to output a third digital signal representing the amplitude of a threshold voltage signal and for applying said threshold voltage signal to each voltage amplitude of the samples taken to establish the voltage amplitude representing the start of the analog waveform representing the character being recognized.

5. The system of claim 4 in which said dividing means comprises a data processor, said data processor comparing the amplitude of the threshold voltage signal with the amplitude of each of the samples to establish the sample representing the start of the waveform.

6. The system of claim 5 in which said signal generating means includes means for generating an analog waveform representing an unknown unique character and an analog-to-digital converter coupled to said waveform generating means for outputting said signals representing the voltage amplitudes of a number of samples of the first peak of the analog waveform.

7. The system of claim 6 in which said second digital value generating means includes first comparator means coupled to said analog-to-digital converter for comparing the voltage amplitude of each sample with a predetermined threshold voltage, means for generating timing signals and first counter means coupled to said first comparator means and said timing signal generating means and enabled to count the timing signals upon said first comparator means finding a sample whose voltage amplitude is greater than the predetermined threshold voltage.

8. The system of claim 7 which further comprises disabling means coupled to the output of said first counter means and enabled upon the first counter means reaching a first predetermined count to disable said first counter means whereby the number of samples counted is equal to said output count.

9. The system of claim 8 in which said first means includes an accumulator coupled to the output of said analog-to-digital converter for receiving the voltage amplitude of each of the samples taken and a storage means coupled to the input and output of said accumulator for receiving the output of said accumulator and inputting said output to the accumulator enabling said accumulator to sum the voltage amplitudes of the samples taken.

10. The system of claim 9 which further comprises a second storage means coupled to the output of said first counter means for storing the output count of said counter means when enabled and logic means coupled to said first counter means and responsive to the generation of a second predetermined count of the first counter means for outputting a control signal to said second storage means enabling said second storage means to store the output count of said first counter means.

11. In a character recognition system wherein a voltage having an analog waveform unique to each character to be read is generated, said unique waveform including a sequence of varying peak voltage amplitudes corresponding to the shape of the character being read, an apparatus for processing signals representing feature characteristics of the character being recognized, comprising:

(a) means for sampling the first peak of the analog waveform to output signals representing the voltage amplitudes of the samples taken;

(b) means for adding the voltage amplitudes of the samples taken;

(c) means for counting the number of samples taken of the first peak;

(d) and data processing means coupled to said adding means and said counting means for deriving a threshold voltage value by dividing the sum of the voltage amplitudes of the samples taken by the number of samples taken and for applying said threshold voltage to each voltage amplitude of the samples taken to establish the voltage amplitude representing the start of the analog waveform representing the character being recognized.

12. The apparatus of claim 11 in which said data processing means subtracts the threshold voltage value from the samples taken to determine which sample represents the start of the analog waveform representing the character being recognized.

13. The apparatus of claim 11 which further comprises timing means for generating timing signals defining a sampling rate and a first comparator means coupled to said sampling means for comparing the voltage amplitude of each sample with a predetermined threshold voltage value, said counting means is coupled to said first comparator means and said timing signal generating means and enabled upon the comparator means finding a sample whose voltage amplitude is greater than the predetermined threshold voltage value to count the number of samples taken in accordance with the timing signals received.

14. The apparatus of claim 13 which further comprises disabling means coupled to the output of said counting means and enabled upon the counting means reaching a first predetermined count to disable said counting means whereby the number of samples counted is limited to said counting means output count.

15. The apparatus of claim 14 in which said disabling means is enabled to disable said counting means upon the counting means reaching a second predetermined count.

16. The apparatus of claim 14 which further comprises first gating means coupled to said comparator means and said adding means, said gating means enabled by said comparator means to output a first control signal to said adding means enabling said adding means to add the voltage amplitudes of the samples outputted by said sampling means upon said comparator means finding a sample whose voltage amplitude is greater than said predetermined threshold voltage value.

17. The apparatus of claim 16 in which said adding means includes an accumulator coupled to the output of said sampling means for receiving the voltage amplitude of each of the samples taken and a storage means coupled to the input and output of said accumulator for receiving the output of said accumulator and inputting said output to the accumulator enabling said accumulator to sum the voltage amplitudes of the samples taken.

18. The apparatus of claim 14 which further comprises a storage means coupled to the output of said counting means for storing the output count of said counting means when enabled and first logic means coupled to said counting means and responsive to the generation of a third predetermined count of the counting means for outputting a control signal to said storage means enabling said storage means to store the output count of said counting means.

* * * * *